(12) United States Patent
Miller et al.

(10) Patent No.: US 8,381,658 B1
(45) Date of Patent: Feb. 26, 2013

(54) HYDROGEN FUEL CELL HYBRID LOCOMOTIVES AND METHODS OF OPERATING THE SAME

(75) Inventors: Arnold R. Miller, Lakewood, CO (US); Kris S. Hess, Westminster, CO (US); Timothy L. Erickson, Parker, CO (US); James L. Dippo, Arvada, CO (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 13/385,412

(22) Filed: Feb. 17, 2012

Related U.S. Application Data

(63) Continuation of application No. 12/462,473, filed on Aug. 4, 2009, now Pat. No. 8,117,969.

(60) Provisional application No. 61/137,950, filed on Aug. 5, 2008.

(51) Int. Cl.
*B61C 3/00* (2006.01)
(52) U.S. Cl. ............... 105/50; 105/26.05; 105/61
(58) Field of Classification Search ............... 105/26.05, 105/35, 49, 50, 61; 180/65.1, 65.21, 65.31, 180/68.4, 68.6
See application file for complete search history.

(56) References Cited

U.S. PATENT DOCUMENTS

| | | | | |
|---|---|---|---|---|
| 6,380,637 B1 * | 4/2002 | Hsu et al. | ...................... | 290/1 R |
| 6,649,289 B2 * | 11/2003 | Hsu et al. | ...................... | 429/420 |
| 6,649,292 B2 * | 11/2003 | Breuer et al. | ................. | 429/415 |
| 7,011,902 B2 | 3/2006 | Pearson | | |
| 7,011,904 B2 * | 3/2006 | Bunker | ......................... | 429/439 |
| 7,098,779 B2 * | 8/2006 | Pontius | ......................... | 340/439 |
| 7,325,498 B2 * | 2/2008 | Kumar et al. | ................... | 105/35 |
| 7,444,944 B2 * | 11/2008 | Kumar et al. | .............. | 105/26.05 |
| 2005/0053814 A1 * | 3/2005 | Imamura et al. | ................ | 429/22 |
| 2005/0206331 A1 * | 9/2005 | Donnelly | ......................... | 318/52 |
| 2005/0279242 A1 * | 12/2005 | Maier et al. | ................ | 105/26.05 |
| 2006/0035120 A1 * | 2/2006 | Sakai | .............................. | 429/22 |
| 2006/0061307 A1 * | 3/2006 | Donnelly | ...................... | 318/108 |
| 2006/0093880 A1 * | 5/2006 | Igarashi et al. | ................. | 429/22 |
| 2006/0266255 A1 * | 11/2006 | Donnelly et al. | .............. | 105/61 |
| 2006/0266256 A1 * | 11/2006 | Donnelly et al. | .............. | 105/61 |
| 2006/0283350 A1 * | 12/2006 | Kumar et al. | .............. | 105/26.05 |
| 2007/0144398 A1 * | 6/2007 | Kumar et al. | ................... | 105/50 |
| 2007/0298298 A1 * | 12/2007 | Ishigaki et al. | ................. | 429/24 |
| 2008/0031801 A1 * | 2/2008 | Lackner et al. | .............. | 423/438 |
| 2008/0118800 A1 * | 5/2008 | Devriendt et al. | ............. | 429/26 |
| 2008/0121136 A1 * | 5/2008 | Mari et al. | ...................... | 105/35 |
| 2008/0148993 A1 * | 6/2008 | Mack | .............................. | 105/35 |
| 2008/0210185 A1 * | 9/2008 | Kubo et al. | ................... | 123/1 A |
| 2008/0250804 A1 * | 10/2008 | Kubo et al. | ..................... | 62/241 |
| 2008/0264291 A1 * | 10/2008 | Pike et al. | ....................... | 105/50 |
| 2008/0268313 A1 * | 10/2008 | Hirayama | ...................... | 429/26 |

(Continued)

FOREIGN PATENT DOCUMENTS

WO WO 01/04984 1/2001

*Primary Examiner* — Jason C Smith
(74) *Attorney, Agent, or Firm* — Thompson & Knight LLP; James J. Murphy

(57) ABSTRACT

A method of operating a locomotive including a set of electrical traction motors, a fuel cell power module for generating electrical current for the traction motors, an air system for providing an air mass to the fuel cell power module, and a cooling system for cooling the fuel cell power module. When an amount of power is requested from the power module, a required current and a stoic set point for the power module are determined. From the required current, the stoic set point, and numerical factors characterizing the power module, an air mass flow set point is determined for producing the requested amount of power. A compressor set point including speed and torque set points of a compressor motor are determined for the air system to produce the air mass flow corresponding to the requested amount of power.

23 Claims, 23 Drawing Sheets

U.S. PATENT DOCUMENTS

2009/0035613 A1* 2/2009 Chikugo et al. ............... 429/13
2009/0087702 A1* 4/2009 Yonekura et al. ............... 429/13
2010/0030448 A1* 2/2010 Roth et al. ............... 701/103
2010/0087979 A1* 4/2010 Neusinger et al. ............. 701/22

* cited by examiner

HYDROGEN FUEL CELL HYBRID LOCOMOTIVES AND METHODS OF OPERATING THE SAME

CROSS-REFERENCE TO RELATED APPLICATIONS

The present application is a continuation of U.S. patent application Ser. No. 12/462,473, filed Aug. 4, 2009 now U.S. Pat. No. 8,117,969, to Miller et al. for "Hydrogen Fuel Cell Hybrid Locomotives" and claiming the benefit of U.S. Provisional Patent Application Ser. No. 61/137,950, filed Aug. 5, 2008.

FIELD OF INVENTION

The present invention relates in general to railroad locomotives, and in particular to, hydrogen fuel cell hybrid locomotives.

BACKGROUND OF INVENTION

Railroads remain one of the most efficient means for transporting freight and passengers over relatively long distances. Yet, like many industries, the railroad industry is facing numerous challenges related to the upward trend in the cost of fossil fuels and increasing pressure to limit the impact of trains on the environment. The root cause for many of these challenges is the propulsion systems traditionally used in railroad locomotives.

Diesel-electric locomotives employ a diesel engine to drive an electric power generator, which in turn drives a set of traction motors that rotate the locomotive wheels. Diesel-electric locomotives have the advantage of requiring a minimal amount of support infrastructure and thus are particularly suited for providing transport across remote geographical regions. On the other hand, because diesel-electric locomotives consume diesel, they contribute to urban air pollution and are subject to operating costs tied directly to the cost of oil.

Catenary-electric locomotives run directly from an electricity source, typically electric lines running above the railroad tracks. Catenary-electric locomotives are cleaner-operating on a locomotive-by-locomotive basis than diesel-electric locomotives; however, catenary-electric locomotives must be viewed as small parts of a much larger distributed power system, which includes an electricity generation plant, transformers, and a system of transmission lines required to bring electricity to the locomotives as they run down the tracks. This large distributed power system is typically unsuitable for remove geographic regions and overall is less efficient than a system utilizing diesel locomotives.

Railroad locomotives come in different sizes and configurations, depending on the specific task they are required to perform. For example, line-haul freight locomotives, which are commonly seen running along the rail-lines in the U.S., are larger and more powerful systems designed to move fully assembled trains over long distances. On the other hand, switch locomotives ("switchers") are smaller systems primarily used in rail yards for moving cars during the assembly and disassembly of trains. In any case, locomotive designs must be robust, given the day to day stresses to which locomotives are subjected.

Alternative locomotive propulsion systems, which address the problems with diesel-electric and catenary-electric propulsion systems, would be a significant benefit to the railroad industry. However, any such alternative systems must be capable of meeting the rigors experienced by locomotives everyday, including the shock loads generated during the coupling of rail cars. Additionally, propulsion systems that are applicable to different types of locomotives (e.g. line-haul freight locomotives and switchers) would be an additional and significant advantage.

SUMMARY OF INVENTION

The principles of the present invention are embodied in a hydrogen hybrid locomotive including a set of batteries for driving a plurality of electric traction motors for moving the locomotive along a set of railroad rails and a fuel cell power plant for charging the set of batteries and driving the electric traction motors. The fuel cell power plant includes at least one fuel cell power module for generating electrical current by reacting hydrogen fuel and oxygen from intake air, the amount of electrical current generated being proportional to an air mass flow of the intake air. An air system selectively provides an air mass flow to the fuel cell module to generate an amount of electrical current required for corresponding operating conditions of the locomotive. A cooling system cools the at least one fuel cell power module in response to the amount of current being generated.

The embodiments of the principles of the present invention address a number of technical problems related to weight, center of gravity, packaging, and safety, not found in the development of hydrogen hybrid fuel cell propulsion systems for smaller vehicles. As a result, a number of significant advantages can be realized as hydrogen hybrid fuel cell locomotives embodying the principles of the present invention are deployed. Among other things, such hydrogen hybrid fuel cell locomotives help reduce particulate air pollution in urban rail yards, as well as reduce the amount of greenhouse gases expelled into the atmosphere. Furthermore, the use of hydrogen as a fuel reduces the dependency of the railroads on imported oil and decouples locomotive operating costs from the volatile fossil fuel markets. Moreover, hydrogen hybrid fuel cell locomotives can act as mobile electricity sources, for example in disaster recovery scenarios.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
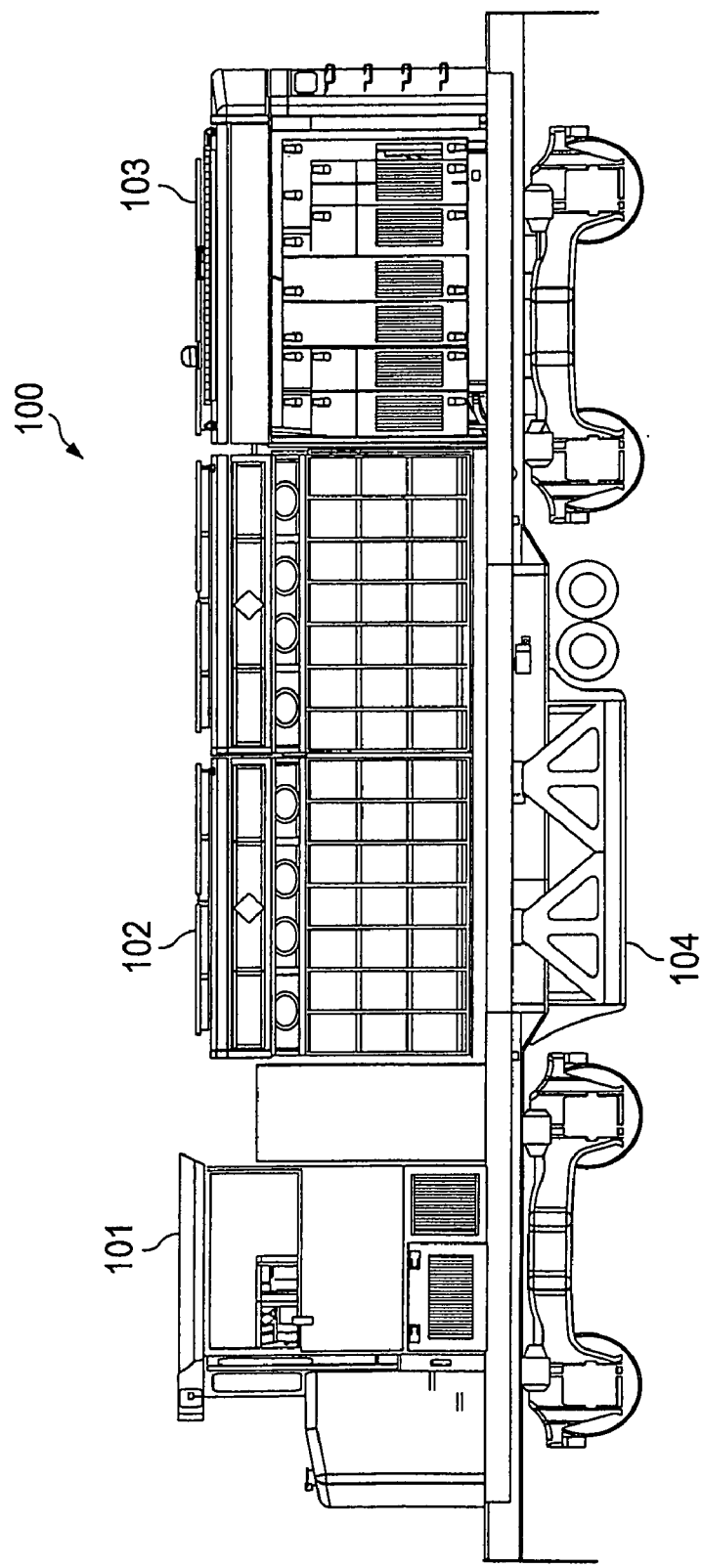
FIGS. 1A-1D are respectively left-side, top, front, and rear views of a representative hydrogen fuel cell hybrid locomotive embodying the principles of the present invention.

The principles of the present invention and their advantages are best understood by referring to the illustrated embodiment depicted in FIGS. 1-17 of the drawings, in which like numbers designate like parts.

FIGS. 1A-1D are respectively left-side, top, front, and rear views of a hydrogen fuel cell hybrid ("hydrogen hybrid") switching locomotive 100 embodying the principles of the present invention. It should be recognized that while the principles of the present invention are being described with respect to a switching locomotive embodiment, these principles are applicable to the design and construction of linehaul locomotives, as well.

The various components and subsystems of hydrogen hybrid locomotive 100 will be discussed in detail below. Generally, hydrogen hybrid locomotive 100 includes a cab section 101 containing the control systems used by the operator, a center section 102 containing the batteries and the hydrogen storage tanks, a rear housing section 103 containing the hydrogen fuel cell power plant, and an adjustable ballast section 104 disposed under the locomotive chassis.

The rear housing 103 includes a set of configurable louvers 105 above the cooling module, which, under the control of the locomotive electronic control systems, allows cooling module fans to exhaust and dilute the purged hydrogen which is expelled through the diffuser mounted above the louvers.

Generally, hydrogen hybrid locomotive 100 weighs approximately 280,000 pounds (127 tonnes) and operates from a set of batteries and a proton exchange membrane (PEM) fuel cell power plant, which together provide a continuous power of 250 kW and a transient power of at least 1 MW. In the preferred embodiment, the basic locomotive platform is based on a Green Goat™ diesel-battery hybrid switch engine commercially available from Railpower Technologies Corp. The PEM fuel cells are available from Ballard Power Systems Inc.

One primary factor in the design of hydrogen hybrid locomotive 100 is the duty cycle P(t), where P is the vehicle power, and t is the time recorded from an in-service yard switching locomotive. From the duty cycle P(t), the locomotive required mean power, maximum power, power response time, and power duration are calculated. The energy storage requirements are calculated from the integral of P(t).

For a typical switch locomotive, the peak power reaches 600-1000 kW for durations of no more than several minutes, normally when train cars are accelerated or the locomotive travels uphill. On the other hand, the required power is minimal when the locomotive is idling between car move operations. Idle time usually accounts for 50-90% of the operations schedule of a typical switch locomotive. In the design of hydrogen hybrid locomotive 100, an analysis of the duty cycles of typical switching locomotives in various switch yards showed that the combination of long idle periods and short peak power periods resulted in a mean power usage in the range of only 40-100 kW.

In hydrogen hybrid locomotive 100, the hydrogen fuel must be capable of providing at the mean power of the duty cycle. Additionally, in hydrogen hybrid locomotive 100, lead acid batteries provide the auxiliary power/energy storage. These lead acid batteries must be capable of storing sufficient energy to provide power, at a minimum, from the rated continuous power up to the peak required power of around 1100 kW for the illustrated embodiment.

At the same time, the power and energy provided by the batteries must not exceed a relatively shallow depth of discharge such that the size of the batteries can be minimized. Depth of discharge is a function of acceptable battery cycle life and recharge rate. In the illustrated embodiment, the depth of discharge of the lead acid batteries is limited to approximately 80% of full capacity.

Figure 2:
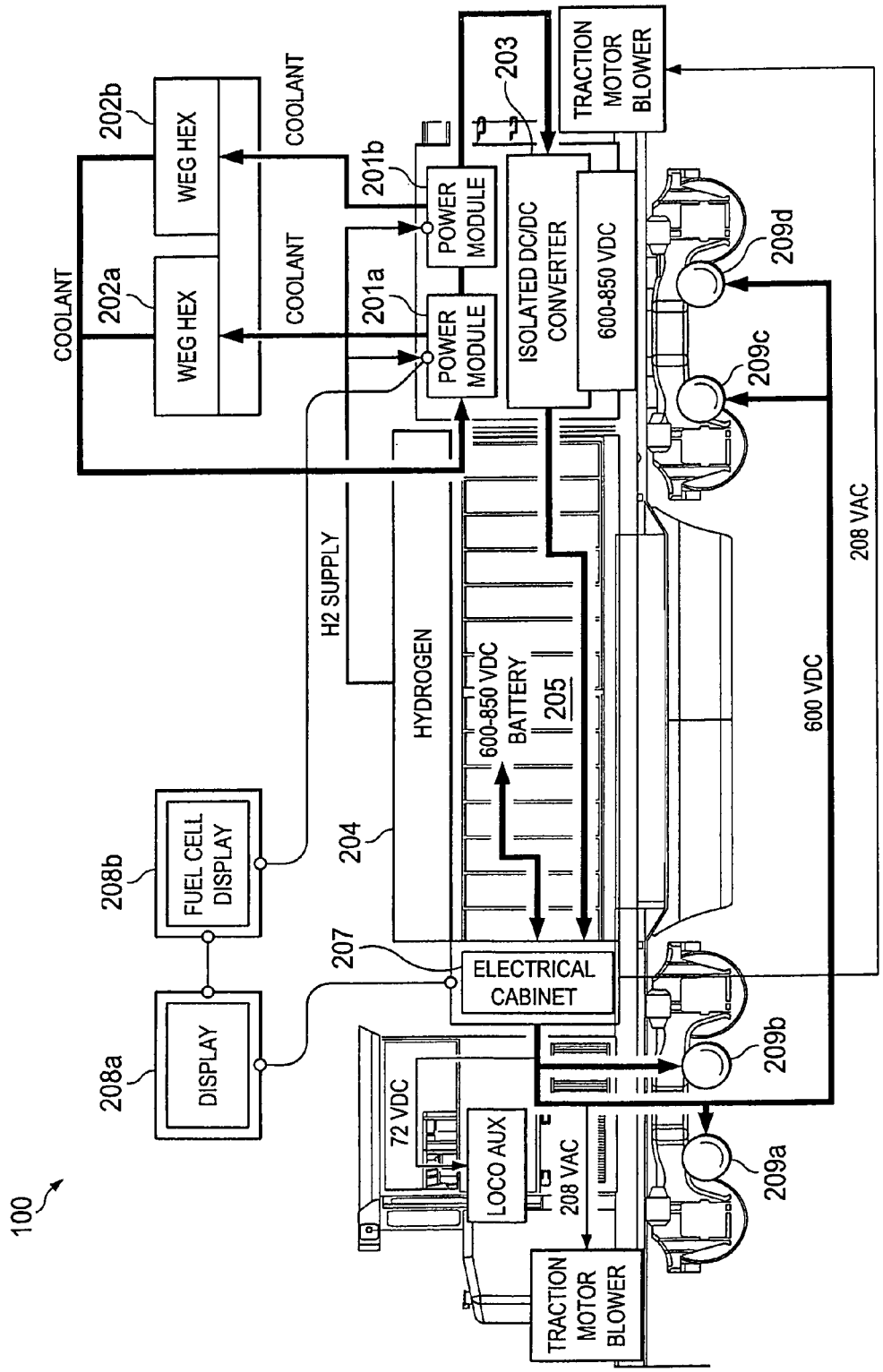
FIG. 2 is a diagram showing the integration of a hydrogen fuel cell system into the hydrogen hybrid locomotive 100 of FIGS. 1A-1D.

FIG. 2 is a diagram showing the integration of the fuel cell system into hydrogen hybrid locomotive 100. Rear housing 103 includes a hydrogen fuel cell power plant based on two (2) power (stack) modules 201a and 201b, along with corresponding ethylene glycol cooling systems 202a and 202b and a DC to DC power converter 203.

Hydrogen is provided to power modules 201a-201b from fourteen (14) carbon-fiber composite tanks 204, which collectively store approximately 70 kg of hydrogen at 350 bar. Hydrogen tanks 204 are disposed above lead-acid batteries 205. Power from fuel cell DC to DC converter 203 and batteries 205 is distributed through a high-voltage bus system 207 to various locomotive systems, including displays 208a and 208b and 600 VDC traction motors 209a-209d.

Figure 3:
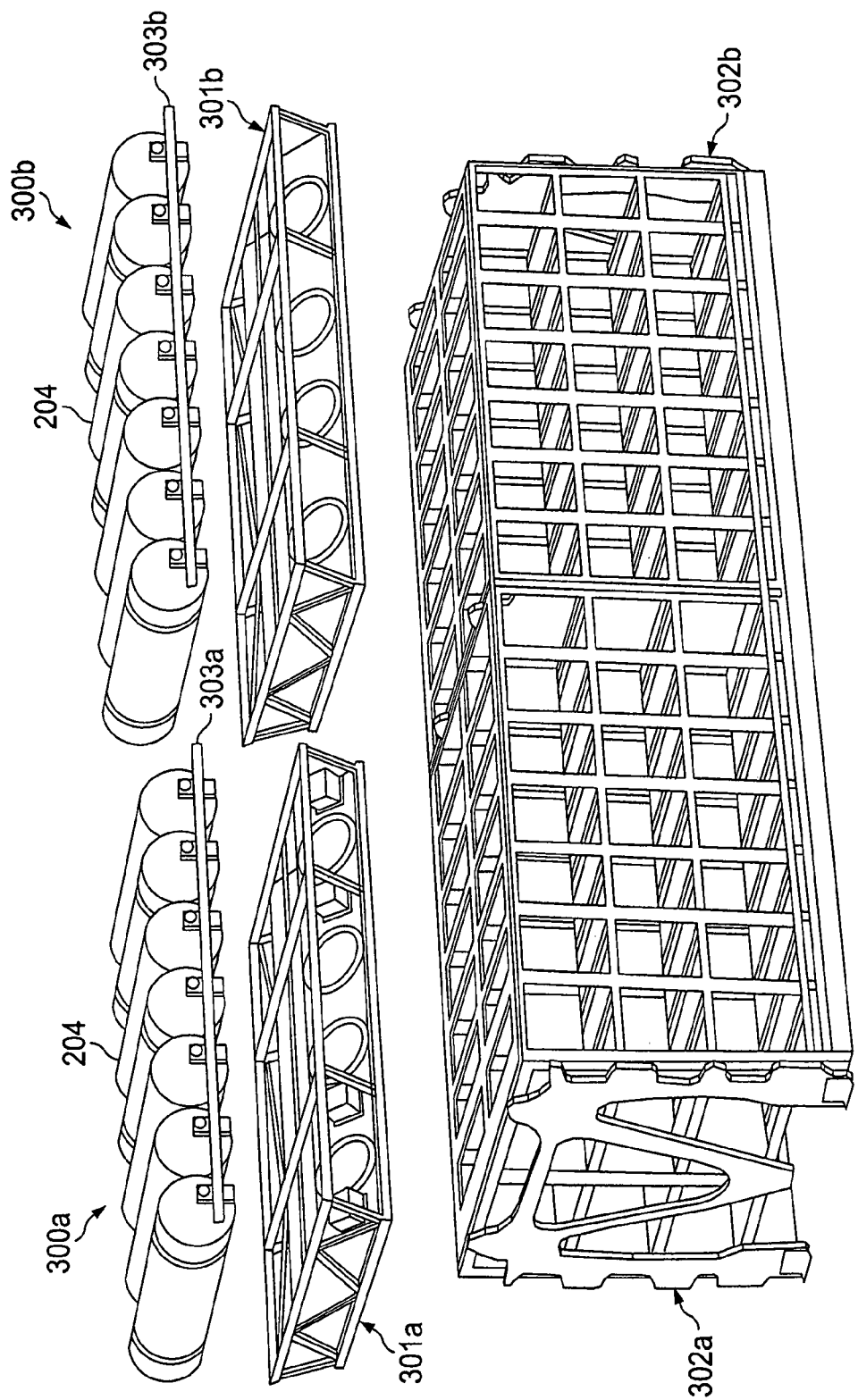
FIG. 3 is diagram showing a preferred method of mounting the hydrogen tanks of FIG. 2 to the battery racks.

FIG. 3 is a diagram showing a preferred method of mounting hydrogen tanks 204. As a shown in FIG. 3, hydrogen tanks 204 are partitioned into two (2) hydrogen storage modules 300a and 300b, each consisting of seven (7) carbon fiber/aluminum tanks (cylinders) 204 that collectively store approximately 35 kg of compressed hydrogen. The total amount of hydrogen available through both hydrogen modules 300a and 300b is approximately 70 kg at 350 bar. Each hydrogen storage module 300 is mounted on a corresponding mounting frame 301a-301b and battery rack 302a-302b.

Advantageously, by mounting hydrogen tanks 204 at the top of hydrogen hybrid locomotive 100, any hydrogen escaping due to a leak harmlessly dissipates upward. (In contrast, storing hydrogen below void volumes could result in hydrogen confinement and an increased possibility of detonation.) Furthermore, locating hydrogen tanks towards the top of the locomotive minimizes the likelihood of damage in a derailment or by impact with track debris or yard traffic.

Hydrogen tanks 204 are preferably carbon fiber/aluminum tanks, which measure 416 mm diameter and 2100 in length, and weigh approximately 100 kg. Each tank includes an excess flow valve, two thermally activated pressure relief devices (PRD), a temperature sensor, an electronically controlled solenoid valve and a manual shut-off valve. The excess flow valve closes in the event of a line rupture between the given tank and the corresponding manifold. Each thermally activated TRD vents hydrogen through a venting line, routed upward and away from hydrogen hybrid locomotive 100, upon the detection of heat in excess of approximately 109° C. (which may occur, for example, in the event of a battery fire). The temperature sensors are also used to regulate refueling speed. The electronic solenoid valve, which is normally closed, is powered open in the run and defueling modes, and closed if a high-level system fault is detected.

The individual tanks 204 feed a corresponding module manifold 303a or 303b, each of which is provided with an independent pressure sensor, which is connected to a primary distribution line. The primary distribution line includes an excess-flow valve for controlling any ruptures. In turn, primary distribution line connects to a refueling line, and then to a filter, pressure regulator, additional electronic solenoid valve, pressure sensor, and an additional PRD. The additional solenoid valve adds a layer of shutdown capability, while the pressure sensor verifies regulator functionality. Emergency shutoff devices located on both sides of hydrogen hybrid locomotive 100 allow non-operators or refueling personnel to shut down the system.

As stated above, hydrogen hybrid locomotive 100 is based on a commercially available diesel-hybrid donor platform. Consequently, because hydrogen tanks 304 are relatively light in weight (i.e. approximately 100 kg); they have minimal effect on the locomotive center of gravity. However, ballast of approximately 9000 kg is required in the undercarriage to provide a locomotive weight of 127 tonnes, which is necessary to produce sufficient wheel adhesion to support tractive effort.

Figure 4:
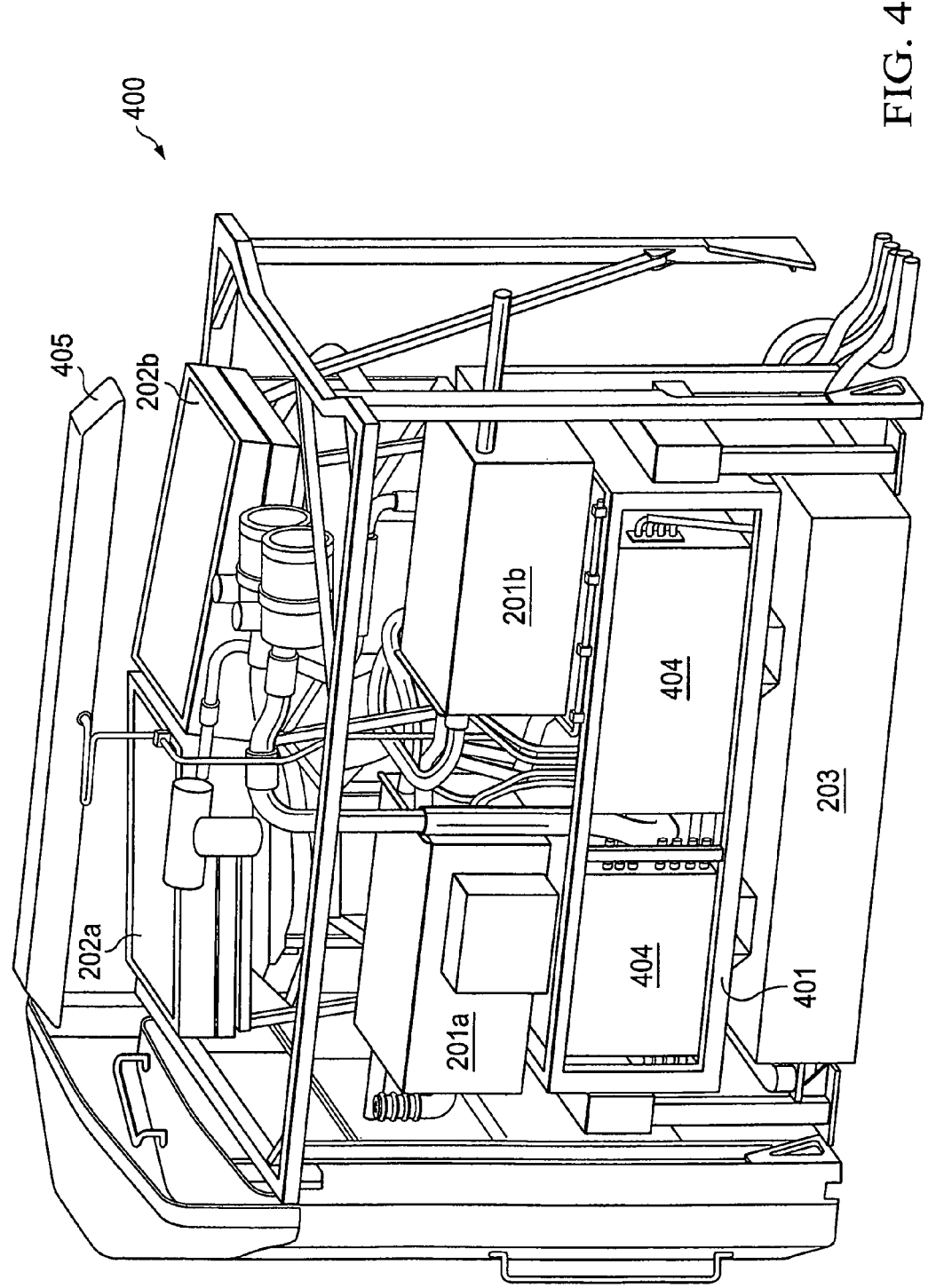
FIG. 4 is a diagram illustrating the fuel cell power plant, as mounted on its isolating support structure.

FIG. 4 provides an overall view of power plant 400, which produces electric power from hydrogen and air. Power plant 400, which is supported by isolating support structure 401, includes power modules 201a and 201b, corresponding cooling modules 403a-403b, and the balance of the plant (BOP) 404, which includes the air system and water management equipment. DC to DC converter 203 is disposed under support structure 401. A purge diffuser 405 sits above cooling modules 403a-403b and is disposed within the exhaust air flow of the cooling system radiators, as discussed in detail below.

In the illustrated embodiment, power modules 201a-201b are based on Ballard Power Systems Mk903 PEM fuel cell stacks. Each power module 201a-201b is rated at 150 kW gross power at 624 VDC, such that power plant 400 provides a total of 300 kW gross power a 624 VDC. Each power module 201a-201b also includes various systems for air and hydrogen humidification, water recovery, hydrogen recirculation, and hydrogen purge. Hydrogen is supplied from hydrogen tanks 204 at a nominal pressure of 12 bars absolute (bara) and is re-circulated within the corresponding stack.

Figure 5A:
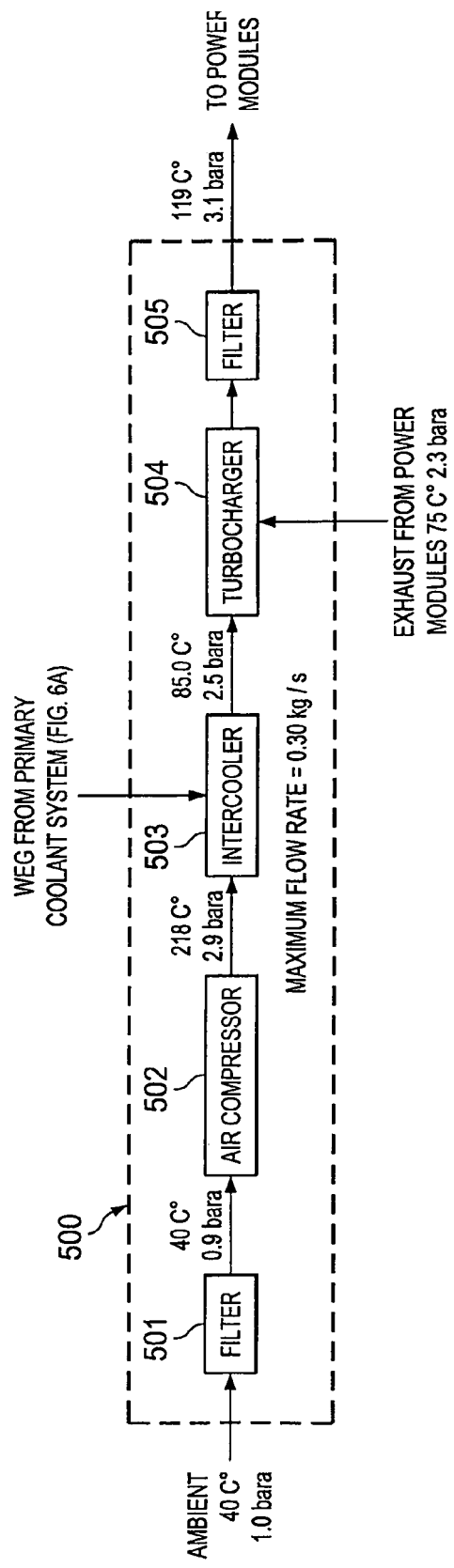
FIG. 5A is a block diagram of air system 500, which provides air to the power modules of the power plant of FIG. 4.
Figure 5B:
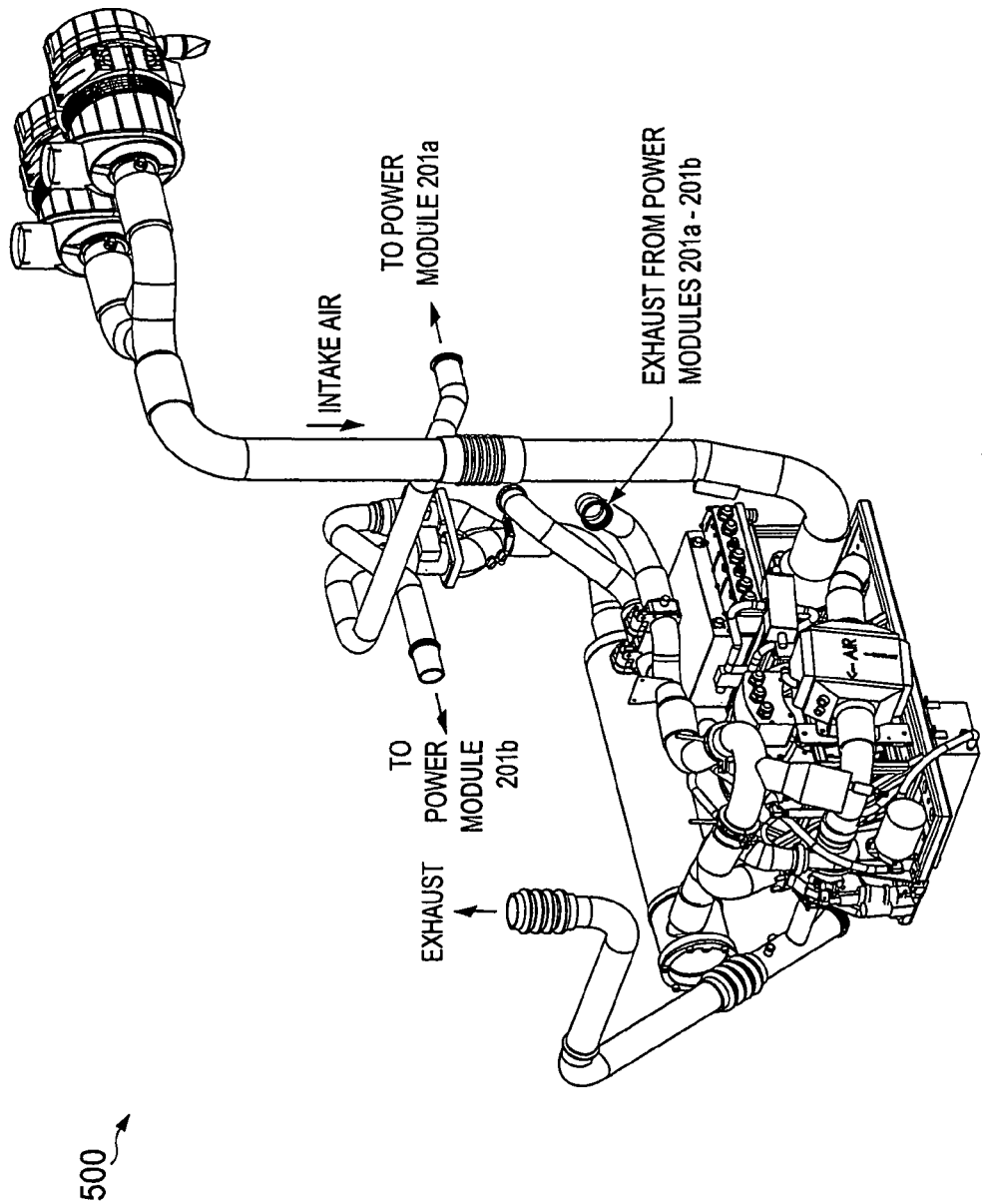
FIG. 5B is a diagram of the mechanical structure of air system shown in FIG. 5A.

FIG. 5A is a block diagram illustrating air system 500, which provides air to power modules 201a and 201b at a pressure of approximately 3 bara and a maximum mass flow of approximately 300 gs$^{-1}$. The physical structure of air system 500, for the preferred embodiment of hydrogen hybrid locomotive 100, is shown in FIG. 5B. It should be noted that the pressures and temperatures provided in FIG. 5A are exemplary values based on calculations for the illustrated embodiment of hydrogen hybrid locomotive 100 and may vary in actual physical embodiments of air system 500, as well as in different embodiments of hydrogen hybrid locomotive 100.

Intake air is first passed though a filter 501 and then an air compressor 502, which provides the first stage of a two-stage compression system. In the illustrated embodiment, air compressor is a twin-screw compressor driven by an 55 kW (360 VDC) electric motor.

The air flow output from air compressor 502 is then cooled by a liquid-to-air intercooler 503, which receives WEG cooling liquid from the cooling system (discussed in detail below). The air flow from intercooler 503 is passed though a turbocharger 504 that provides the second stage in the air compression process. Turbocharger 504 is driven by exhaust air from power modules 201a and 201b and controls system back pressure, as well as provides an additional boost in pressure. The output from turbocharger 504 is filtered by filter 505 before delivery to the inlets of power modules 201a-201b.

Figure 6A:
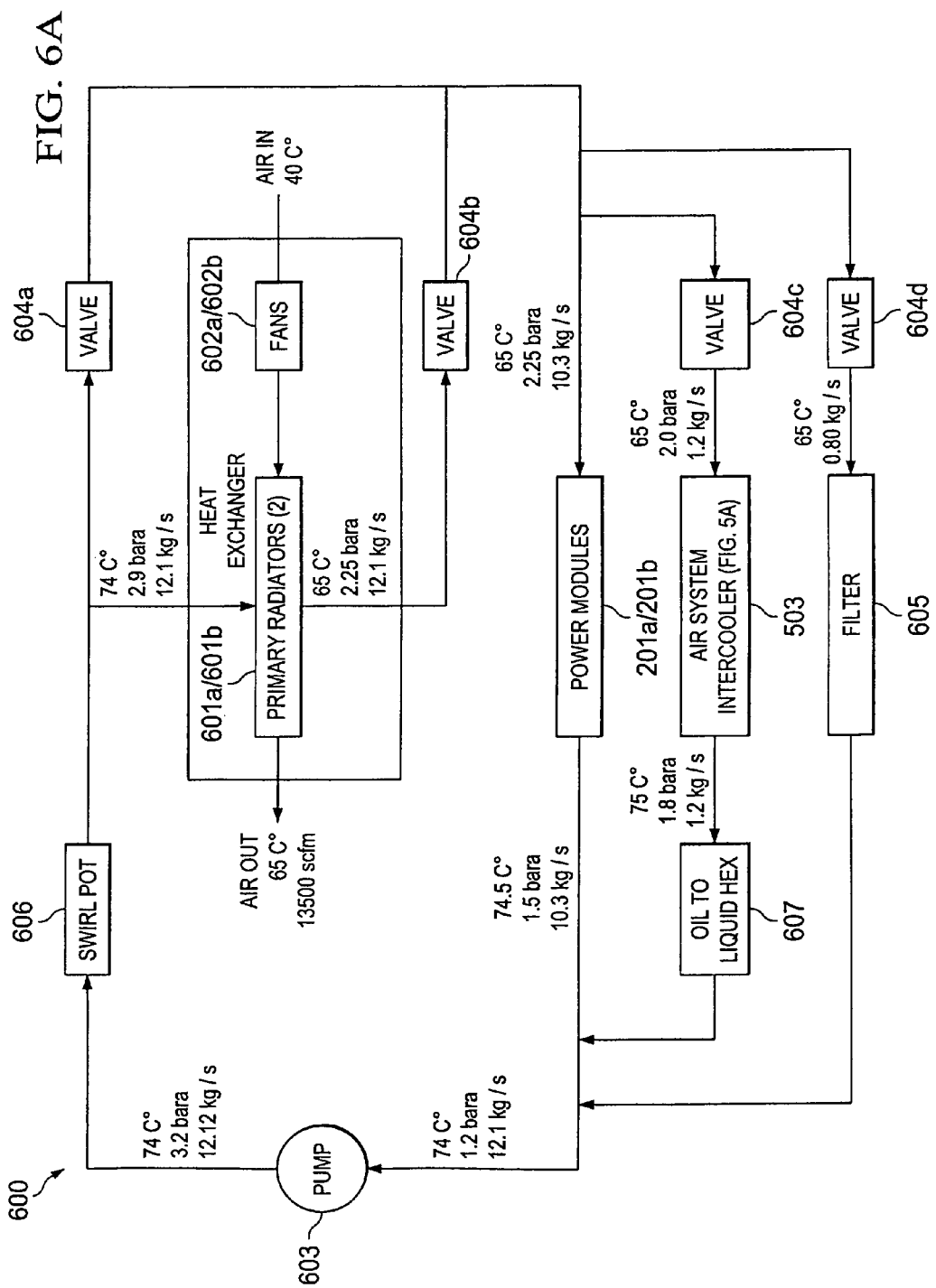
FIG. 6A is a block diagram of the primary cooling loop of the cooling system, which provides coolant to the power modules and air system of the power plant of FIG. 4.
Figure 6B:
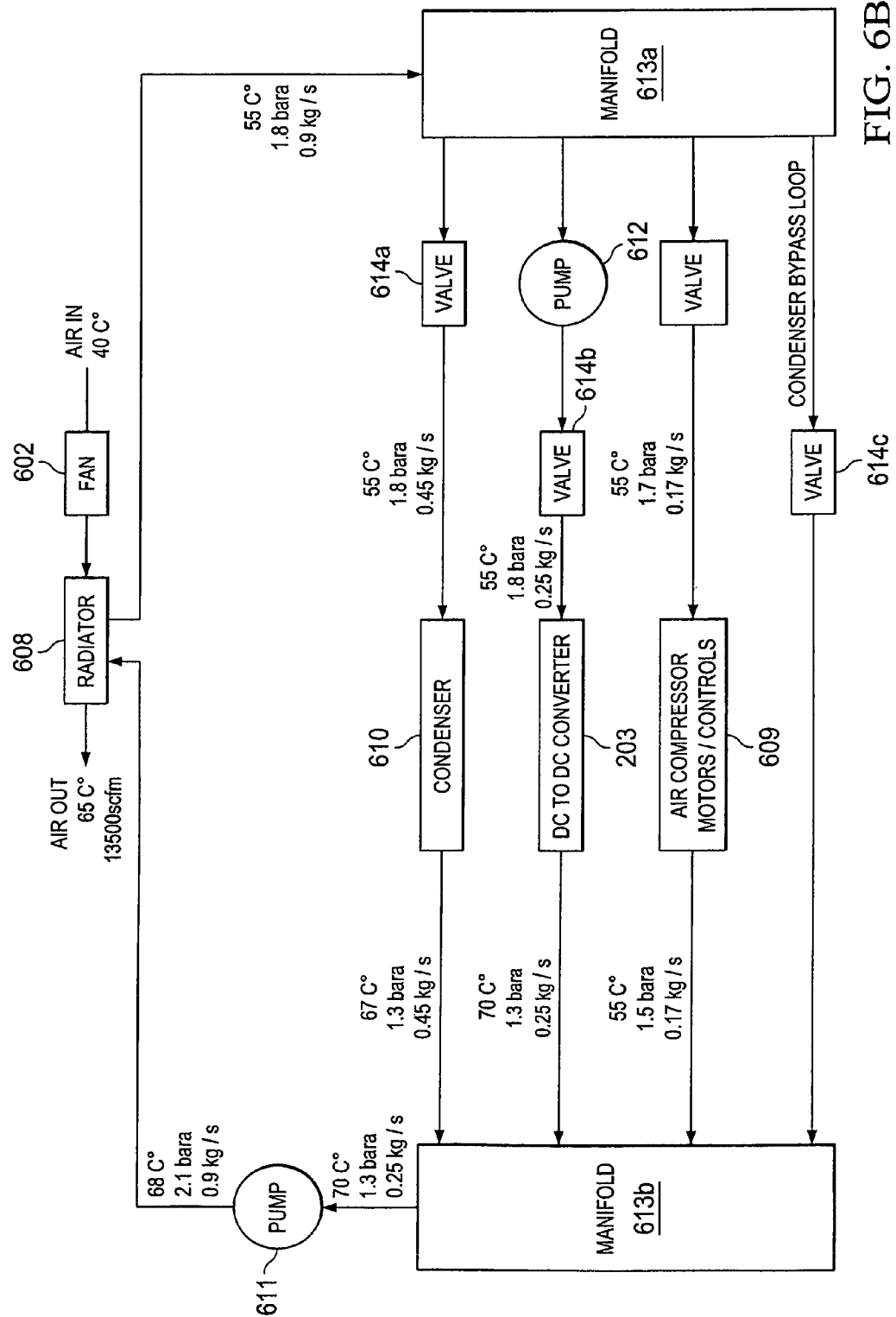
FIG. 6B is a block diagram of the secondary cooling loop of the cooling system, which provides coolant to the DC to DC converter of FIG. 2 and various auxiliary systems.
Figure 6C:
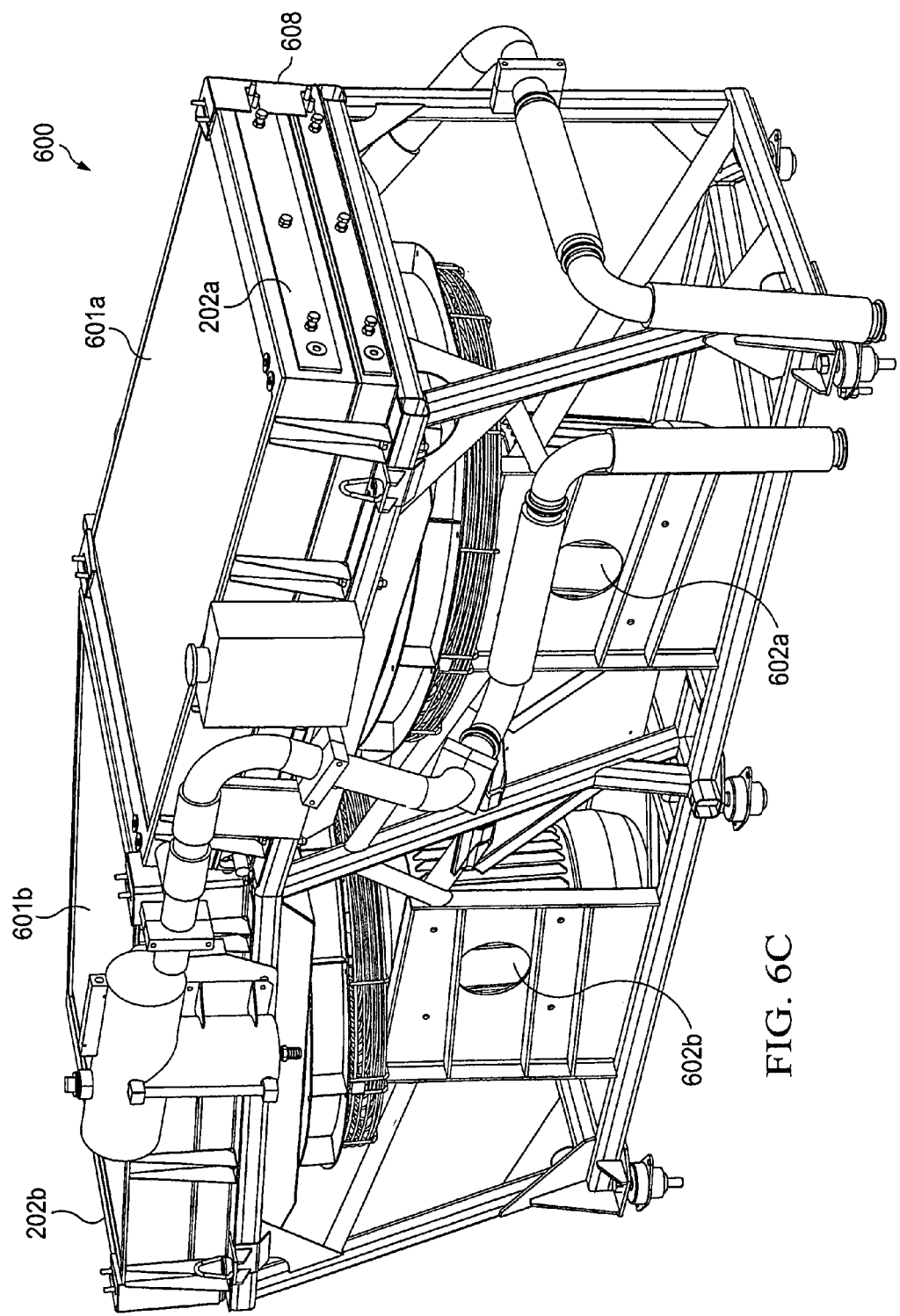
FIG. 6C is a diagram showing front and back views of the physical structure of the cooling system.

Cooling system 600, which is implemented by cooling modules 202a and 202b of FIG. 2, is based on two independent cooling loops. A primary cooling loop, as shown in the block diagram of FIG. 6A, provides coolant to power modules 201a-201b and air system intercooler 503. A secondary cooling loop, shown in the block diagram of FIG. 6B, provides coolant to DC to DC converter 203 and various auxiliary systems, such as the air compressor motor. FIG. 6C is a diagram showing side views of the physical structure of cooling system 600. In FIGS. 6A and 6B, the given pressures, temperatures, and flow rates are exemplary values based on calculations for the illustrated embodiment of hydrogen hybrid locomotive 100 and may vary in actual physical embodiments of cooling system 600, as well as in different embodiments of hydrogen hybrid locomotive 100.

The primary cooling system shown in FIG. 6A is based on a pair of primary radiators 601, a corresponding pair of fans 602, and a pump 603. Additionally, the primary loop includes a mixed bed ion-exchange resin to maintain de-ionization of the 50% water-%50 ethylene glycol (WEG) cooling liquid. A set of flow control valves 604a-604d control fluid flow through the various other subsystems. Valves 604a and 604b in particular allow for bypass of radiators 601 during cold start or when an increase in coolant fluid temperature is required (e.g. during cold weather operation).

In the preferred embodiment, the overall fuel cell power operating efficiency is assumed to be on the order of 50%. Consequently a heat rejection rate of approximately 300 kW is provided by cooling system 600, mostly by primary radiators 601.

Pump 603 is preferably a centrifugal pump driven by a 7 kW induction motor (230 VAC) and provides coolant flow of up to 675 L min$^{-1}$. A closed-loop control system maintains a specific coolant temperature difference between the power module inlets and the power module outlets. In the preferred embodiment, the maximum operating temperature of the primary coolant loop is 75° C.

Radiators 601 preferably utilize a two-pass cross counter flow arrangement, and are commercially available from the Modine Fuel Cell products group. Advantageously, the cross-counter flow arrangement significantly increases the logarithmic mean temperature difference and the efficiency of the radiators. In the illustrated embodiment, each radiator has dimensions that are preferably approximately 900 mm×1100 mm.

In the illustrated embodiment, each fan 602 comprises a 32 inch fan driven by a 15 kW induction motor (230 VAC) at approximately 1700 rpm and provides approximately 13,000 CFM of air at maximum operating power at maximum ambient conditions.

The primary cooling loop also includes a filter 605 for removing particulate matter from the coolant fluid, a swirl pot 606 for coolant filling, and an oil to liquid heat exchanger 607 on the outlet of intercooler 503.

In the secondary coolant loop shown in FIG. 6B, a secondary radiator 608 is provided physically in line with one of the primary radiators 601 of the primary loop of FIG. 6B and hence utilizes a single airflow path with the corresponding fan 602. The secondary cooling loop system provides heat rejection for drive motor/controller 609 of air compressor 502, fuel cell stack module condenser 610, DC to DC converter 203, and the lube system. The overall rate of rejection is approximately 40 kW, providing coolant to components at approximately 55° C.

A centrifugal pump 611, which in the illustrated embodiment is driven by a ½ kW motor (24 VDC), provides 80 L min$^{-1}$ of coolant at maximum power under maximum ambient conditions. A secondary pump 612 provides coolant flow to DC to DC converter 203. For cold weather protection, the cooling system incorporates a "block heater" with a pump that heats and circulates coolant through the primary cooling loop to prevent stack freezing.

A pair of manifolds 613a and 613b, along with flow control valves 614a-614c, control fluid flow through the various subloops of the secondary cooling loop.

Figure 7A:
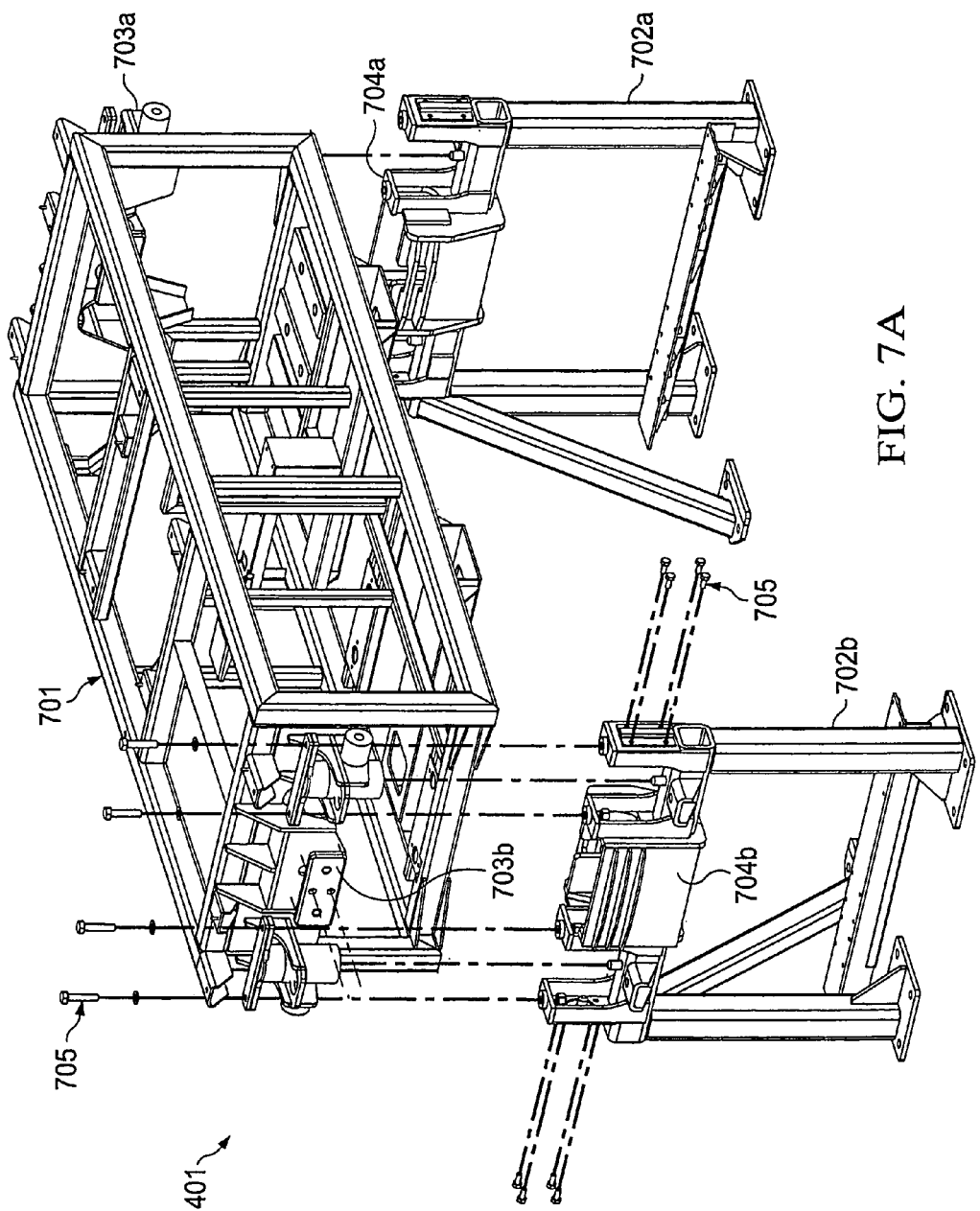
FIG. 7A-7C are a series of views illustrating the isolating support structure of FIG. 4 in further detail.
Figure 7B:
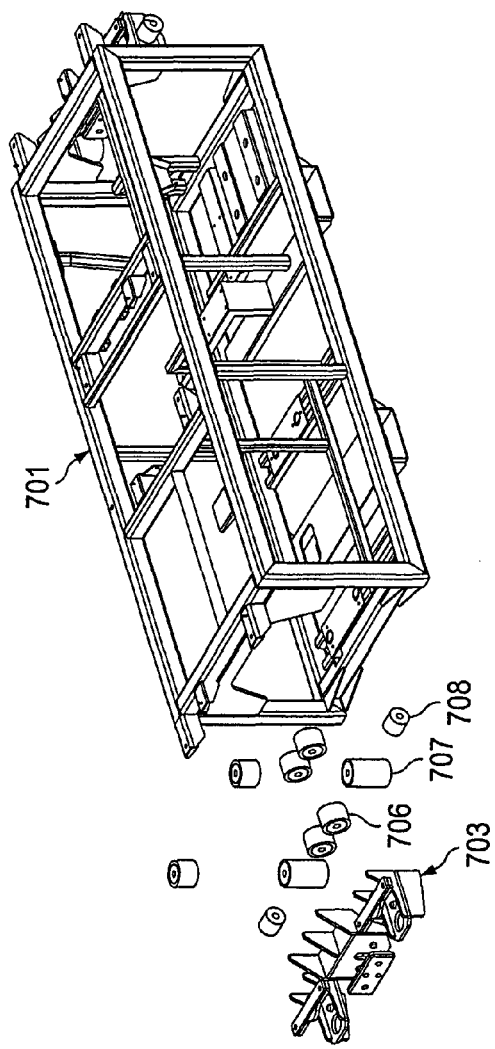
Figure 7C:
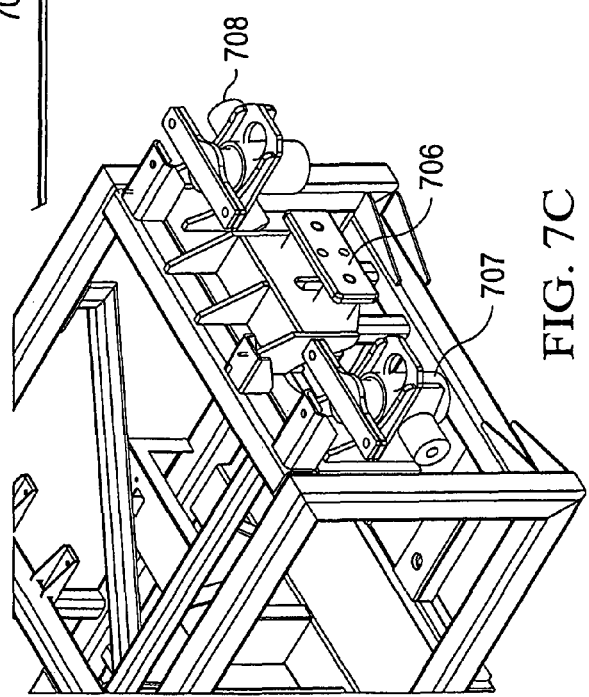

FIGS. 7A-7C are a series of views illustrating power module support structure 401 of FIG. 4 in further detail.

As discussed above, mounting of power module 400 is of critical importance, particularly in switch locomotive embodiments of the principles of the present invention, such as hydrogen hybrid locomotive 100. Switch locomotives are primarily used to couple together cars when forming trains, and thus are repeatedly subjected to shocks of up to 10Gs, typically as 11 ms saw tooth waveforms. Notwithstanding the short time duration of these shocks, their magnitude is sufficient to cause immediate or fatigue failure of the components and structures of the locomotive, in the absence of properly designed isolation structures.

According to the principles of the present invention, power module mounting frame 401 utilizes set of rubber or synthetic mounts and rigid legs to reduce shock loads transmitted to power modules 201a-201b, cooling system 600, and air system 500. Generally, these isolators reduce the typical switch engine 10G shock loads to a maximum of 3Gs and account for shock loads and vibrational energy in all of the horizontal, lateral, and vertical directions. Furthermore, the isolators absorb energy through a deflection distance that allows power module mounting frame 401 to fit within the physical constraints imposed on it by the dimensions of power plant 400, including those of the air and coolant systems. For example, the isolation mount movement is constrained to provide space for such structures as the coolant hoses. Additionally, power module mounting frame has a natural frequency that is well below the possible disturbing frequencies generated during the operation of hydrogen hybrid locomotive 100. Finally, power module mounting frame 401 has a vertical center of gravity that minimizes rocking motion of power module 400 and transmits force directly downward into the locomotive chassis.

As shown in FIG. 7A, power module mounting frame 401 includes mounting frame 701, which contain power modules 201a and 201b and BOP 404, and two rigid end support frames 702a-702b, which fasten to the primary frame of hybrid locomotive 100.

Isolation brackets 703a-703b on mounting frame 701 interface with corresponding brackets 704a-704b on rigid end support frames 702a-702b. In the illustrated embodiment, mounting frame 701 is fastened to end support frames 702a-702b with bolts 705.

FIGS. 7B and 7C are more detailed diagrams of power module mounting frame 401 that emphasize the preferred isolation system. Each isolation frame 703 interfaces with mounting frame 701 through a set of rubber or synthetic isolators, as discussed above. In particular, isolators 706 absorb the energy produced by longitudinal shock and vibration transmitted through end support frames 702a-702b. Similarly, isolators 707 absorb energy from vertical shock and vibration, while isolators 708 absorb energy from lateral shock and vibration.

As discussed above, hydrogen hybrid locomotive 100 is based on a diesel hybrid locomotive from which the diesel engines and associated equipment have been removed and replaced with a hydrogen fuel cell power plant. Hydrogen hybrid locomotive 100 therefore no longer carries diesel fuel, which means that its weight is significantly under the weight required to maximize the tractive effort at the wheels. Additionally, the weight lost by the lack of diesel fuel changes the vertical center of gravity and the forward/aft weight distribution.

Figure 1B:
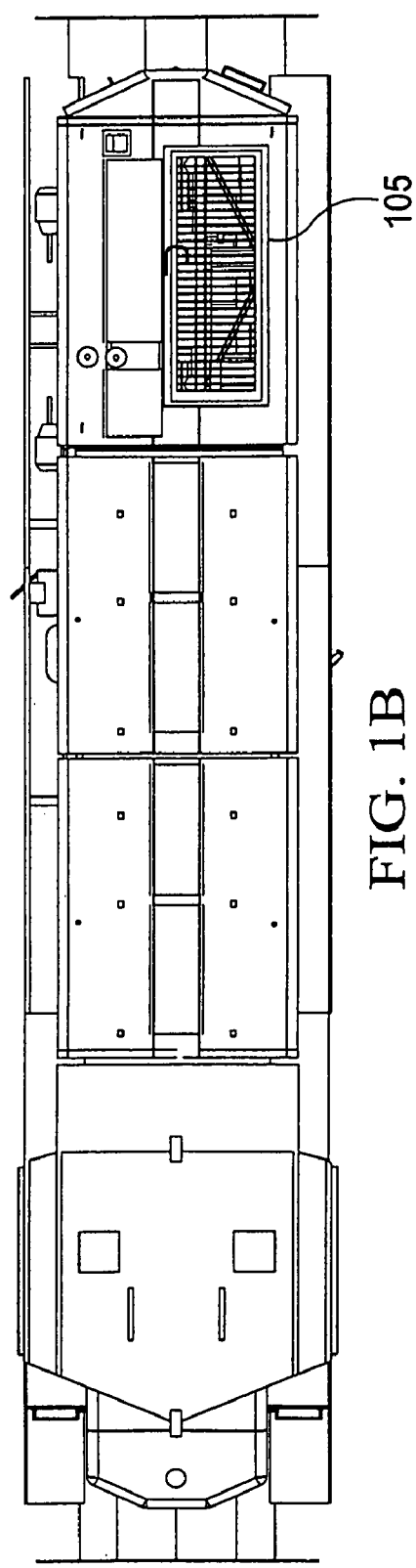
Figure 1D:
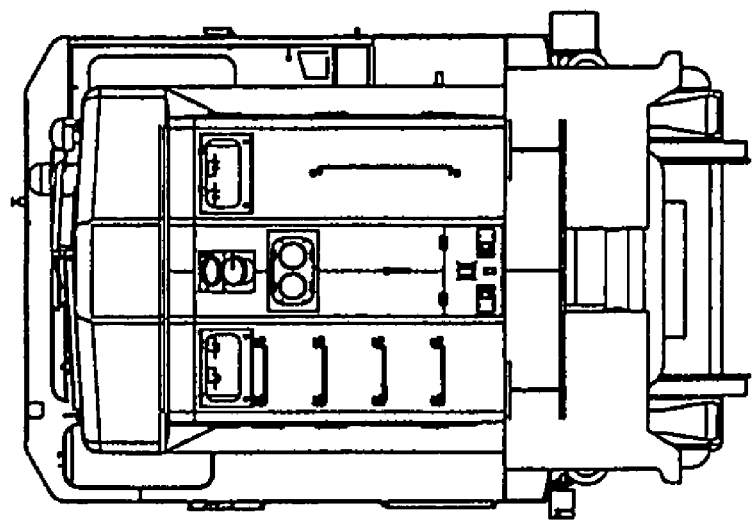
Figure 1C:
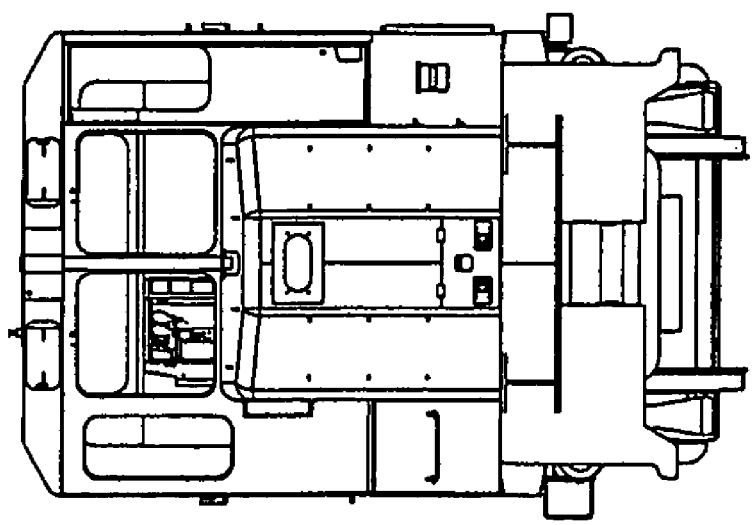
Figure 8A:
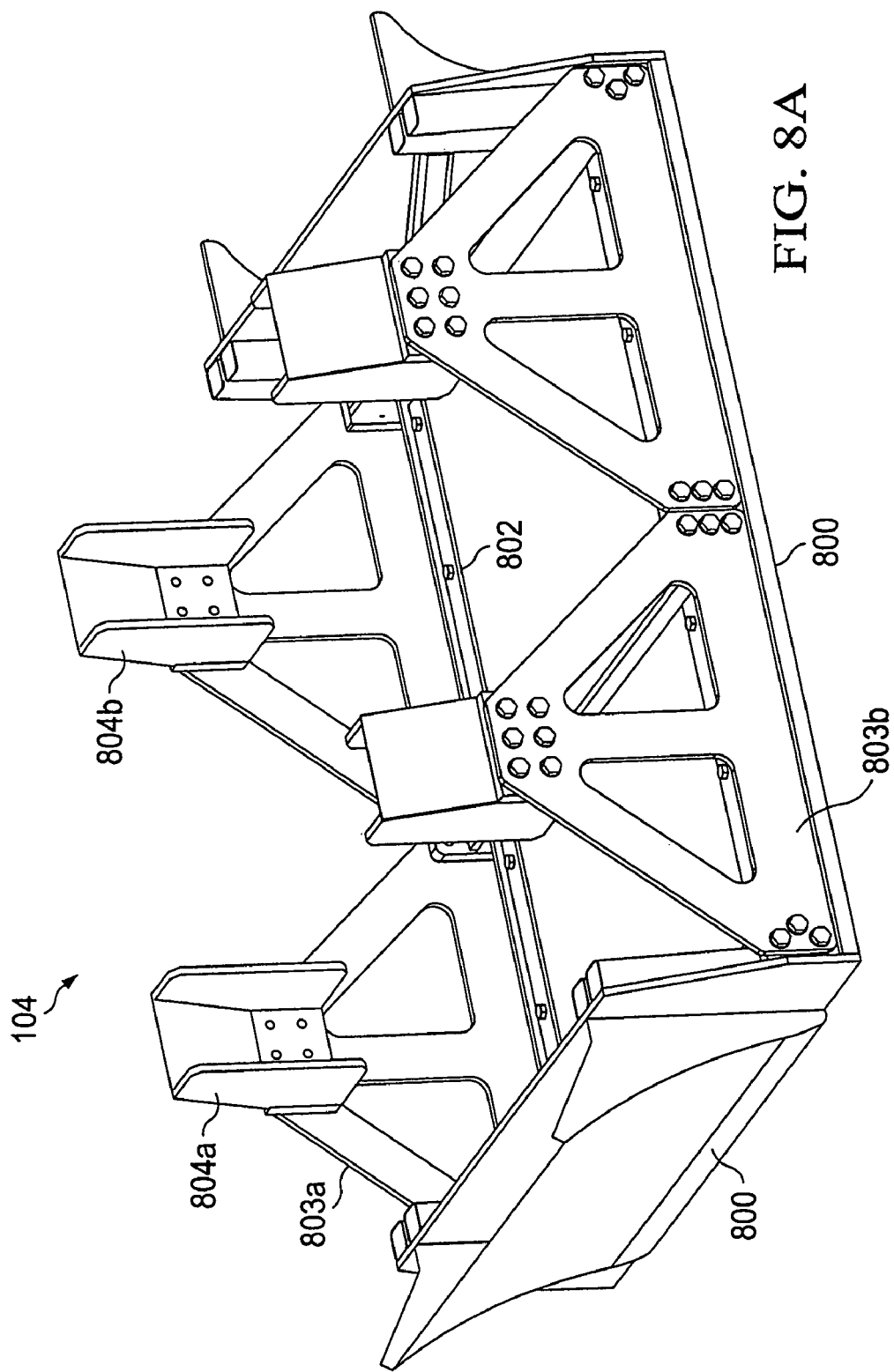
FIGS. 8A and 8B are detailed diagrams of the adjustable ballast system of FIG. 1A.
Figure 8B:
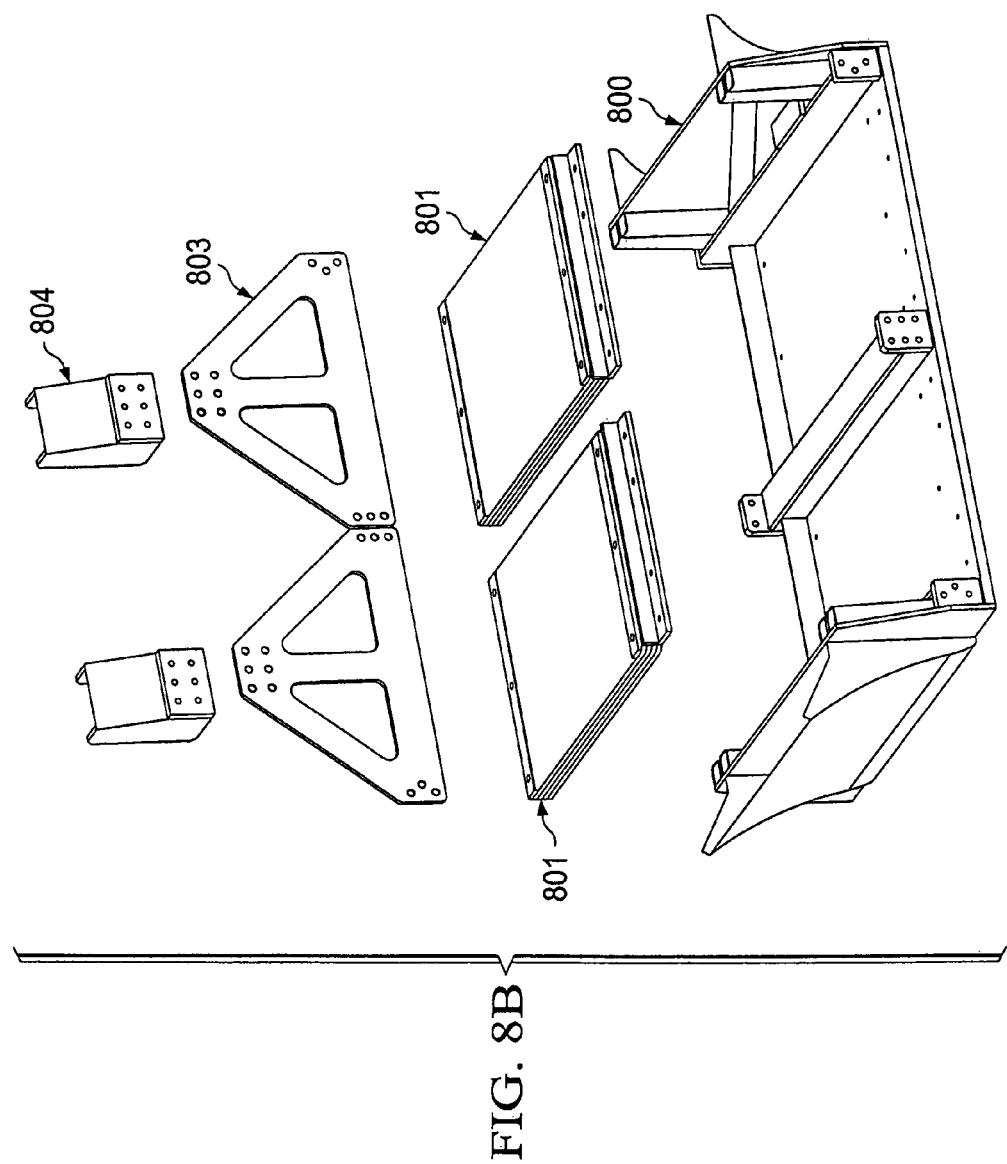

To ensure that hydrogen hybrid locomotive 100 is sufficiently heavy and that the vertical center of gravity and forward/after weight distribution are correct, hydrogen hybrid locomotive 100 includes adjustable ballast system 104 shown in FIG. 1B and described in further detail in FIGS. 8A and 8B. Adjustable ballast system 104 also provides usable space under the locomotive main frame for additional equipment such as air compressors, fans, power electronics, and the like.

As shown in FIGS. 8A and 8B, adjustable ballast system 104 includes a base structure 800, which is preferably a pre-welded assembly that welds to the locomotive primary frame structure. A plate assembly 801, including multiple sheets of thick steel, is bolted into base structure 800 with bolts 802. Two sets of plates are preferably used that allow individual steel plates to be added, removed, or moved for and aft to adjust the amount and location of the ballast weight. A-gusset assemblies 803a and 803b, each of which includes flanges 804a and 804b, bolt to both base structure 800 and the locomotive primary frame. A-gusset assemblies 803a-803b advantageously provide bending stiffness to adjustable ballast assembly 104, as well as provide bolt-on/off access to equipment mounted above the plate assembly.

Figure 9A:
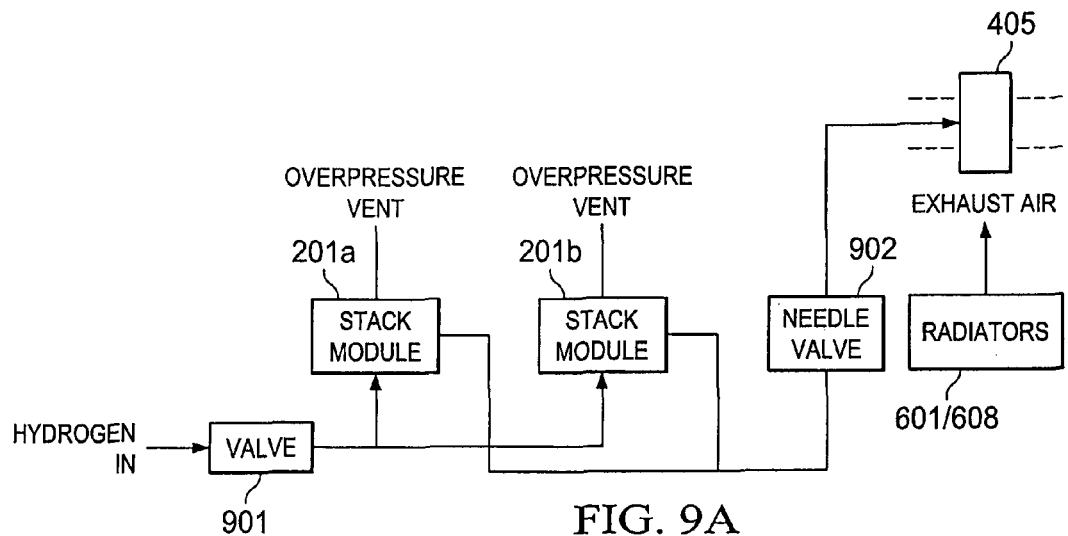
FIG. 9A is a block diagram showing the power module purge system, with FIG. 9B providing a more detailed view of the purge diffuser of FIGS. 4 and 9A.

Hydrogen is supplied and purged from power modules 201a and 201b using the supply and purge system shown in the block diagram of FIG. 9A. During supply, hydrogen is provided to power modules 201a-201b through control valve 901. During hydrogen purge, in which hydrogen may be exiting from power modules 201a-201b at pressures of up to 3 bara, purged hydrogen passes through a purge tuning needle valve 902 and on to purge diffuser 405 (FIG. 4). Exhaust air exiting the coolant system radiators 601/608 dissipates the hydrogen output from diffuser 405.

Figure 9B:
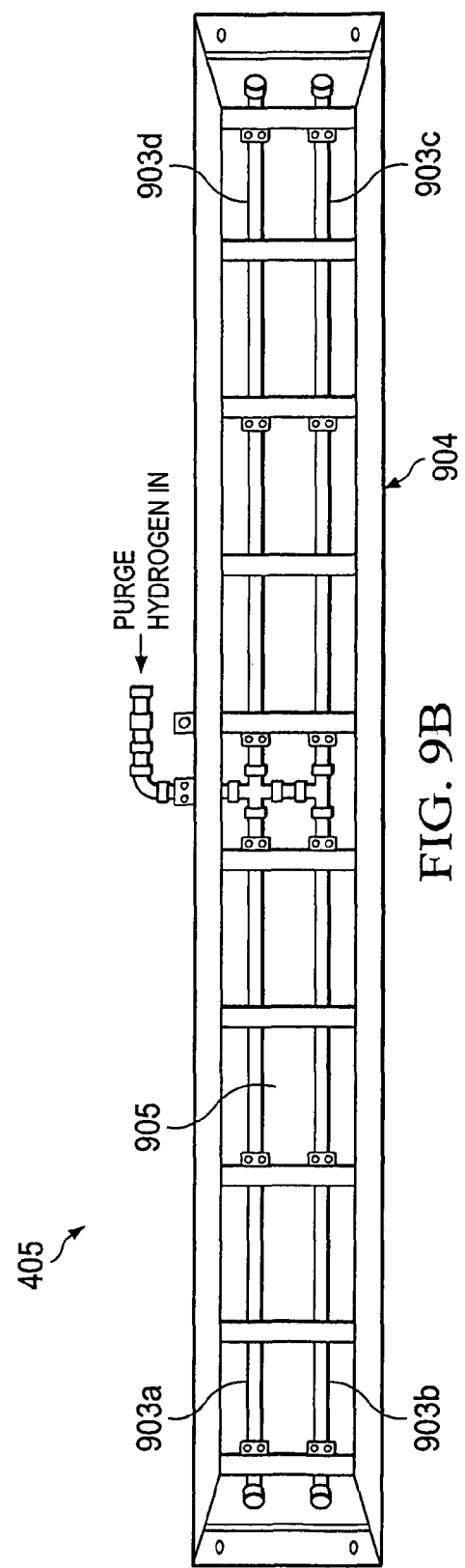

FIG. 9B provides a more detailed view of purge diffuser 405 of FIG. 4. Purge diffuser 405 includes four (4) tubes 903a-903d, each with a series of holes for dispersing purge hydrogen. In the illustrated embodiment, purge diffuser 405 receives purge hydrogen from needle valve 902 through a ½"

tube and hose and each tube 903 comprises a /3;8" tube with twelve (12) ⁵⁄₆₄" holes. Tubes 903a-903d are supported by a frame 904 and protected by a cover plate 905.

Power modules 201a and 201b operate as the prime energy source for moving hydrogen hybrid locomotive 100, as well as the source for charging the batteries. Generally, DC to DC converter 203, which is preferably a boost/buck converter, ensures that the correct power and voltages levels are delivered by bus system 207 (FIG. 2) from power modules 201a and 201b to the various subsystems. DC to DC converter 203.

A system controller determines a power set-point in response information characterizing the operation of hydrogen hybrid locomotive 100 and sets the operating points for BOP subsystems 404, including air system 500 and coolant system 600, as well as the power output of DC to DC converter 203.

The voltage from power modules 201a and 201b varies with the amount of current drawn (e.g. from about 642 to 928 VDC) and DC to DC converter 203 then boosts or bucks the voltage to provide the appropriate level at for the batteries. In addition to the primary power being provided to the batteries and traction motors, power modules 201a and 201b also power BOP components 404 (the "parasitic loads"). Depending on the operating conditions, for example ambient air temperature and altitude, these parasitic loads can represent between 20 and 30% of the overall required power.

In hydrogen hybrid locomotive 100, the current and voltage needs vary greatly; hence, bus system 207 includes several different buses. For example, power plant 400 requires voltages of 600 VDC, 350 VDC, 24 VDC, 12 VDC, and 5 VDC. Inverters provide 230 VAC for both primary coolant pump motor 603 and radiator fan motors 602 and 608.

A high-voltage bus which carries a voltage that varies from about 580 to about 750 VDC, powers traction motors 209a-209d and charges the batteries. A 350V bus supplies power for the air compressor motor and inverters, and 12 VDC and 24 VDC buses are used to power valves, actuators, control systems, and sensors. The locomotive battery provides backup power to the control system when power from power modules 201a and 201b is not available.

Generally, central control of power modules 201a-201b and BOP 404 is implemented through a system of instrumentation, actuators, motor controllers and a programmable automation controller (PAC). (PAC 1700 is discussed further below in conjunction with FIG. 17).

During normal operation, the PAC receives a power set-point from the locomotive controller. The PAC relays this power set-point to the dc/dc converter 203 controller, as well as establishes the conditions necessary for the power plant 400 to generate the requested power through a combination of open-loop and closed-loop control.

The PAC first calculates the mass air flow rate required by power modules 201a and 201b to produce the requested power. This calculation is used to command air compressor 502 of air system 500. PAC then makes small air mass flow rate corrections based on the actual air mass flow delivered to power modules 201a and 201b.

The PAC also measures the current draw to air compressor 502 for use in estimating the amount of cooling required from cooling system 600. Small corrections to the speed of primary cooling pump 603 of coolant system 600 are made by measuring the coolant temperatures. If sufficient air is provided, the hydrogen supply is consumed at a rate proportional to the current drawn from the power modules 201a-201b.

Unsafe or abnormal conditions in power system 400 are monitored by the PAC. Upon detection of such an anomaly, PAC can either prompt a power reduction or even a full shutdown of power plant 400. The status of power plant 400, including the presence of system faults, are provided on user-interface display 208b (FIG. 2). Key fault conditions are also transmitted to the locomotive controller.

As discussed above, the main power source for charging locomotive battery pack 205 is a pair of electrically parallel fuel cell-based power modules 201a and 201b. In the preferred embodiment, each module 201 contains six fuel cell stacks, and each stack contains 160 cells for a total of 960 cells. Power modules are 201 supplied with reactants (hydrogen and air) as well as coolant (de-ionized water and glycol mixture, i.e. WEG or DiGly) and produce high voltage electricity (500 to 1000 VDC). This electrical power is used to replenish battery pack 205 via DC-DC Converter 203.

In order to maintain effective system operation, many process flows, temperatures, and pressures are controlled. Most of these variables are conditions which are supplied to the power module stacks of power modules 201. Air system 500, described above, performs active air flow control with variable speed air compressor 502, as well as stack inlet air pressure control with turbocharger 504. The air temperature in the stack is controlled by the coolant flow rate.

Hydrogen flow within power modules is controlled by stack fuel consumption, jet pump solenoids and opening of purge valves. Hydrogen pressure is controlled with pressure regulators, which are referenced to the air pressure in the stacks.

The coolant flow rate is controlled using primary coolant pump 603, which circulates flow through parallel loops for the power module stacks, the air system intercooler 503, and a filter. Coolant pump 603 is responsible for maintaining the differential temperature across the stacks.

Power module 201 inlet temperature is controlled by the radiator bypass valve 604a, and the radiator outlet temperature is controlled by radiator fans 602. Ideally radiator fans 602 are run at minimum speed and coolant is passed through or bypassed around the radiators 601 to maintain stack inlet temperature. Coolant pressure control is passive and is based upon the coolant pump speed.

High level control functions for the locomotive are divided between a locomotive controller and a power system controller. The locomotive controller is responsible for monitoring the state of charge of batteries 205. The power system controller is responsible for providing the electrical power necessary to charge batteries 205 and provide supplemental traction power during periods of high demand. DC-DC converter 203 delivers the power module 201 power at the voltage of locomotive battery bus 207. The locomotive controller specifies a power requirement and the power system controller establishes the necessary balance of plant conditions necessary for the fuel cell to produce the requested power.

The control system also includes an emergency shutdown pushbutton at the operator's station, which allows immediately shutdown all power system 401 equipment. This button operates independently of the user interface and fuel cell controllers (i.e. it is hardwired). Hydrogen sensors installed in the rear engine compartment containing power system 401 and the hydrogen storage hoods are hardwired into the emergency stop circuit. An elevated hydrogen level will cause these sensors to initiate an emergency stop.

As discussed above, a single electric motor driven variable speed compressor 502 is used in air system 500 to provide air to both of the power modules 201a and 201b. Accurate air flow is important because if too much air is forced through the stacks of power modules 201 for a given air pressure and current, the cell membranes may begin to dry out and water balance may not be achieved. If too little air is forced through the stacks, there is increased risk of flooding the stack and the stack voltage will be low and cell voltages will not be stable.

The amount of oxygen a fuel cell stack consumes is directly proportional to the current supplied by the stack. Therefore, the current demanded can be used to determine the amount of air flow necessary to provide the correct amount of oxygen.

In the illustrated embodiment, there is a 3.39 mechanical speed ratio between the air compressor motor of air compressor 502 and the air compressor itself. In other words, the air compressor rotates 3.39 times faster than the air compressor motor.

Figure 10:
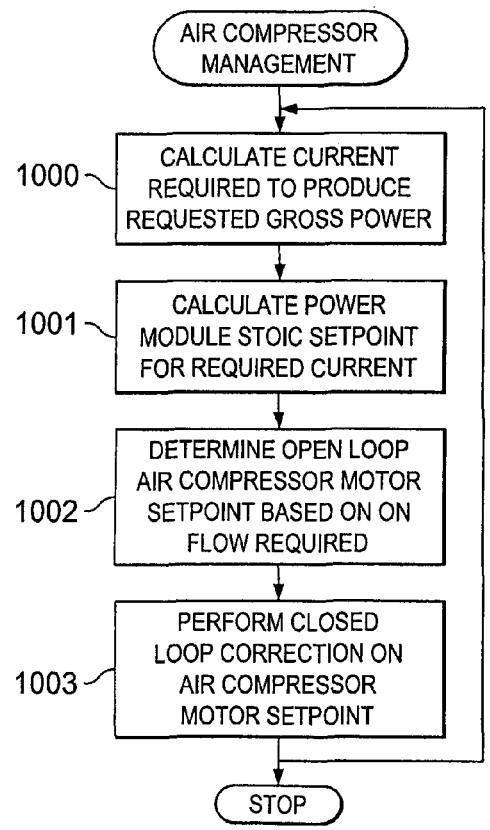
FIG. 10 is a block diagram illustrating a preferred algorithm for controlling the air compressor speed and torque and the air being provided to the power modules.

The compressor control algorithm is generally shown in FIG. 10, and is executed by the PAC on the following input and output variables. A gross power request from the locomotive controller is used to calculate how much air from air system 500 is required to meet the locomotive demand and the required BOP 404 power. The control algorithm also accurately controls air stoichiometry of power modules 201 based on individual module currents and determines air set points from a lookup table.

The compressor control outputs are:
1. Compressor motor speed command; and
2. Compressor motor torque command.

The compressor control inputs are:
1. Power module 201*a* stack air mass flow rate;
2. Power module 201*b* stack air mass flow rate;
3. Power module 201*a* current output transducer;
4. Power module 201*b* current output transducer;
5. Power module 201*a* stack inlet temperature;
6. Power module 201*b* stack inlet temperature;
7. Gross power requested by locomotive controller;

In the Start-up Mode, a startup purge of the power module 201 stacks is performed by setting the compressor motor speed command to 750 RPM, such that air compressor 502 runs at 2543 RPM, with a compressor torque command of 20% for 10 seconds.

In the run mode, a Run Mode control algorithm is executed, which performs the following:
1. Calculates the current required to achieve the power requested by the locomotive controller;
2. Calculates the stoic set-point required for the given current;
3. Performs open loop control of air compressor motor speed command based on air flow required;
4. Performs PID (with proportional derivative controller (PID)) closed loop control of the air compressor motor speed command based on measured air flow; and
5. Sets the motor compressor torque command to 20%.

At Block 1000, for the preferred embodiment of hydrogen hybrid locomotive 100, the current required to generate the requested gross power is calculated. The requested gross power is calculated in the Power Management algorithm discussed below The stoic setpoint is determined as follows (Block 1001, FIG. 10). First, a current set setpoint is calculated for each power module 201 that is half of the total current setpoint. Then, a stoichiometric ratio is determined for each power module stack, namely, Stoichiometric Ratio A and Stoichiometric Ratio B, based on the characteristics of the fuel cell stacks being used, which in this case are Ballard MK902 fuel cell stacks. In addition, the measured stack currents are used to determine the estimated actual stoic ratio for each stack.

The stoic set-points are modified by purge and cold operation factors, also depending on the type of fuel cell stacks used. The modified stoic setpoints are limited based on the corresponding stack current.

The air compressor control algorithm includes open-loop (Block 1002, FIG. 10) and closed-loop portions (Block 1003, FIG. 10). The open-loop portion calculates the amount of power module air flow mass required from the stoic setpoints for each power module 201*a* and 201*b*, the number of cells within each power module stack, and a stack air constant, which is also a function of the type of fuel cells being used.

Both the desired mass flow and actual mass flow values are calculated. The actual mass flows are used in the stoic valves associated with power modules 201 to balance air flow through the stacks.

Given that the air flow is directly proportional to compressor speed, the motor and compressor speeds for air compressor 502 is directly calculated from the required air flow and the desired torque.

The closed-loop portion of the air compressor control algorithm calculates a correction amount via a slow proportional integral derivative (PID) in PID Block 1003 with a range limited to +/− 100 RPM. The error is calculated so that an increase in error creates a negative response.

In actual embodiments, of hybrid locomotive 100, final tuning constants are determined in the field.

In the shut-down mode, a shutdown purge is performed by setting the air compressor speed to 750 RPM (air compressor 502 will run at 2543 RPM) and the air compressor motor torque to 10%.

Figure 11A:
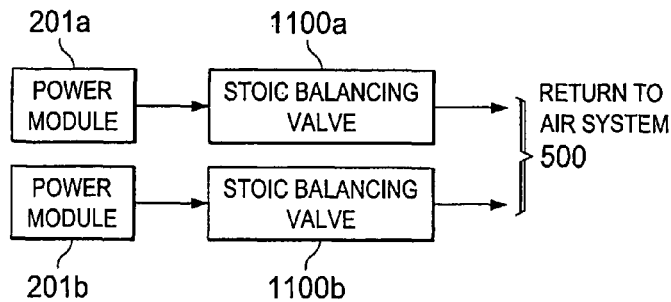
FIG. 11A is a block diagram illustrating the relationship between the power modules and the stoic balancing valves.

Power modules 201*a* and 201*b* are each associated with an external butterfly (stoic control) valve 1100*a*-1100*b* at the air outlet, for balancing the air flow through two power modules as shown in FIG. 11A. Preferably, only one valve is ever commanded to move at a time, and then only in the shut direction. These two valves are decoupled from the air compressor motor controls.

The stoic balancing valve control algorithm balances the air flow between power modules 201*a* and 201*b* and clamps the PWM duty cycles between 5% and 50%. The outputs from the stoic valve control algorithm are:
1. Power module 201*a* Independent Stoic Control Valve position; and
2. Power module 201*b* Independent Stoic Control Valve position.

The inputs operated on by the stoic valve control algorithm are:
1. Measured Power Module 201*a* air mass flow;
2. Measured Power Module 201*b* air mass flow;
3. Power Module 201*a* air flow setpoint (calculated above);
4. Power Module 201*b* air flow setpoint (calculated above).

In the start up and shut down modes, stoic control valves 1100*a*-1100*b* are completely open. This means that their open commands (MOVA, MOVB) are set to 90%, in the illustrated embodiment.

Figure 11C:
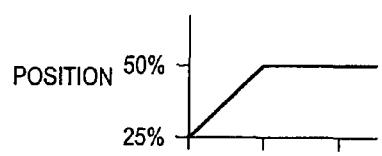
FIG. 11C is a curve characterizing the control of the power module stoic balancing valves.
Figure 11B:
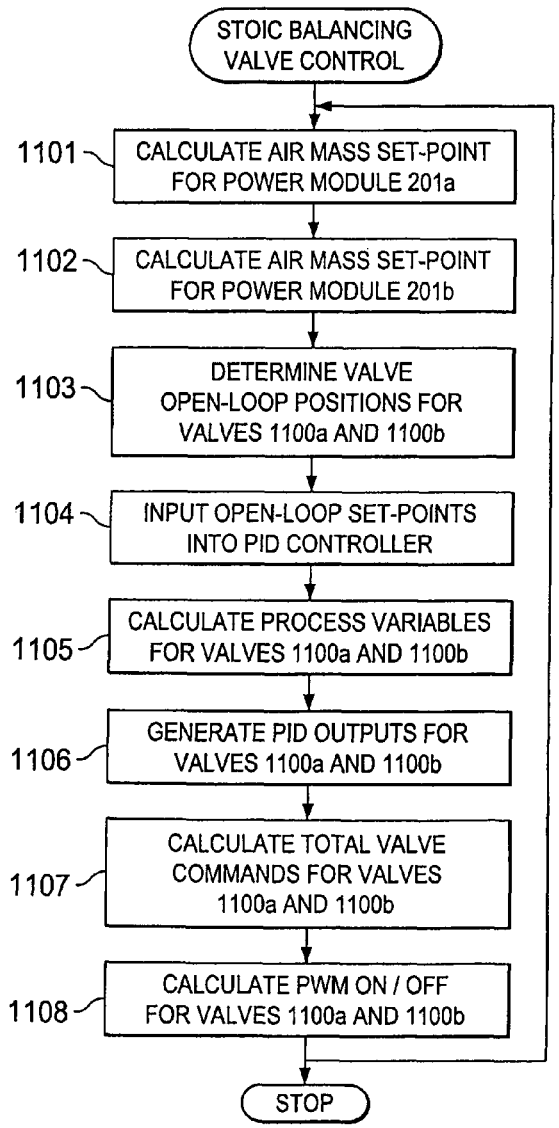
FIG. 11B is a flow chart of a preferred stoic balancing valve control algorithm.

During run mode, the following open loop control is performed, as illustrated in the flow chart of FIG. 11B, Blocks 1101-1103.

First the Power Module 201*a* mass flow setpoint ratio is calculated. If this value is less than 0.5, the valve will start to close (Block 1101):

Air Mass Flow Ratio $A$=Air Mass Set Point $A$/(Air Mass Set Point Total)

Second, the Power Module 201*b* mass flow setpoint ratio. If this value is less than 0.5, the valve will start to close:

Air Mass Flow Ratio $B$=Air Mass Set Point $B$/(Air Mass Set Point Total)

Third, the valve open loop position is determined for each power module 201a-201b (Valve A Open Loop Position and Valve B Open Loop Position) at Block 1103 using the curve provided as FIG. 11C.

Closed-loop control is implemented for each by executing a PID loop for each stoic balancing valve as shown in the flow chart of FIG. 11B, Blocks 1104-1106.

1. Setpoint for Power Module 201a is input (Block 1104): Air Mass Flow Ratio A
2. Setpoint for Power Module 201b is input (Block 1104): Air Mass Flow Ratio B
3. Process variable for Power Module 201a is calculated (Block 1105):

Air Mass Flow Process Variable $A$=Air Mass Flow $A$/(Air Mass Flow $A$+Air Mass Flow $B$).(A value less than 0.5 means the valve will start to close.)

4. Process variable for Power Module 201a is calculated (Block 1105):

Air Mass Flow Process Variable $A$=Air Mass Flow $B$/(Air Mass Flow $A$+Air Mass Flow $B$).)A value less than 0.5 means the valve will start to close.)

5. PID Output for Power Module 201a is generated (Block 1106): Air Mass Flow A Corrected.
6. PID Output for Power Module 201b is generated (Block 1106): Air Mass Flow B Corrected.

The total command PWM on/off times are then calculated according to the block diagram of FIG. 11B; Blocks 1107-1108.

1. Total valve command for Power Module 201a is calculated as (Block 1107):

Valve $A$ Command=Valve $A$ Open Loop Position+Air Mass Flow $A$ Corrected.

2. Total valve command for Power Module 201b is calculated (Block 1107):

Valve $B$ Command=Valve $A$ Open Loop Position+Air Mass Flow $A$ Corrected.

3. The PWM on/off times are calculated for each valve (uSec) (Block 1108). The command is scaled from a range of 0-100 to 0.5-1. The off and on times are then calculated using the PWM (pulse width modulation) frequency:

Turn Off PWM $A$=(scale($MF\_A$,0,0.5,0.5,0.95)*(1/Freq)*1000000 Turn On PWM $A$=(1−scale($MF\_A$,0,0.5,0.5,0.95))*(1/Freq)*1000000

Turn Off PWM $B$=(scale($MF\_B$,0,0.5,0.5,0.95))*(1/Freq)*1000000 Turn On PWM $B$=(1−scale($MF\_B$,0,0.5,0.5,0.95))*(1/Freq)*1000000

As discussed above in conjunction with coolant system 600, radiators bypass valves 604a and radiators outlet valve 604b allow radiators 601 to be bypassed. During normal operation, radiator outlet valve 604b, at the outlet of radiators 601 is completely open and bypass valve 601a is then controlled to maintain the inlet temperature to power modules 201. The advantage of this system is that the speed of radiator fans 602, which presents a large parasitic load, can be minimized while still allowing for additional cooling capacity in the event of a sudden increase in power.

Figure 12:
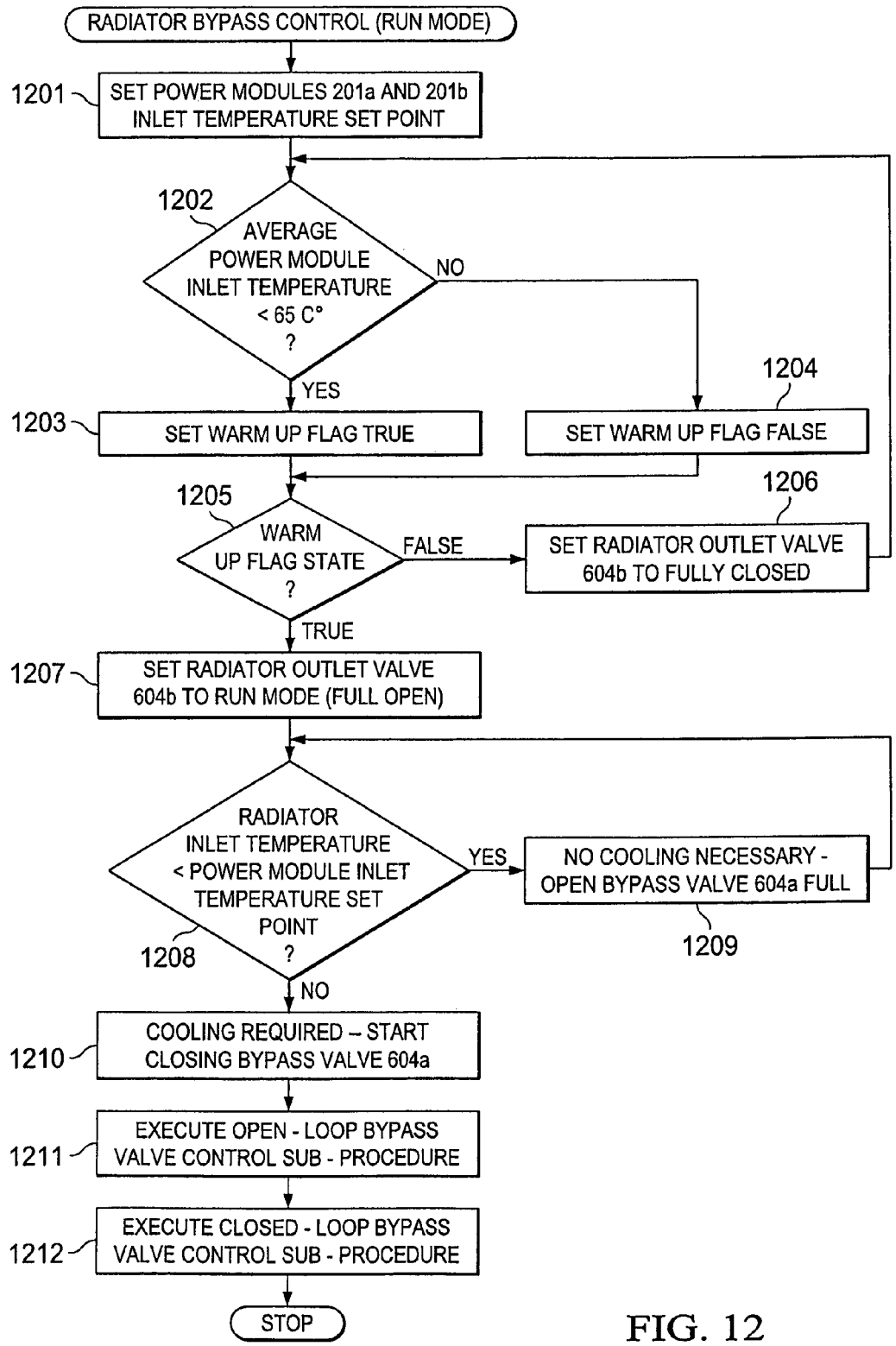
FIG. 12 is a flow chart of a preferred radiator bypass control algorithm.
Figure 13:
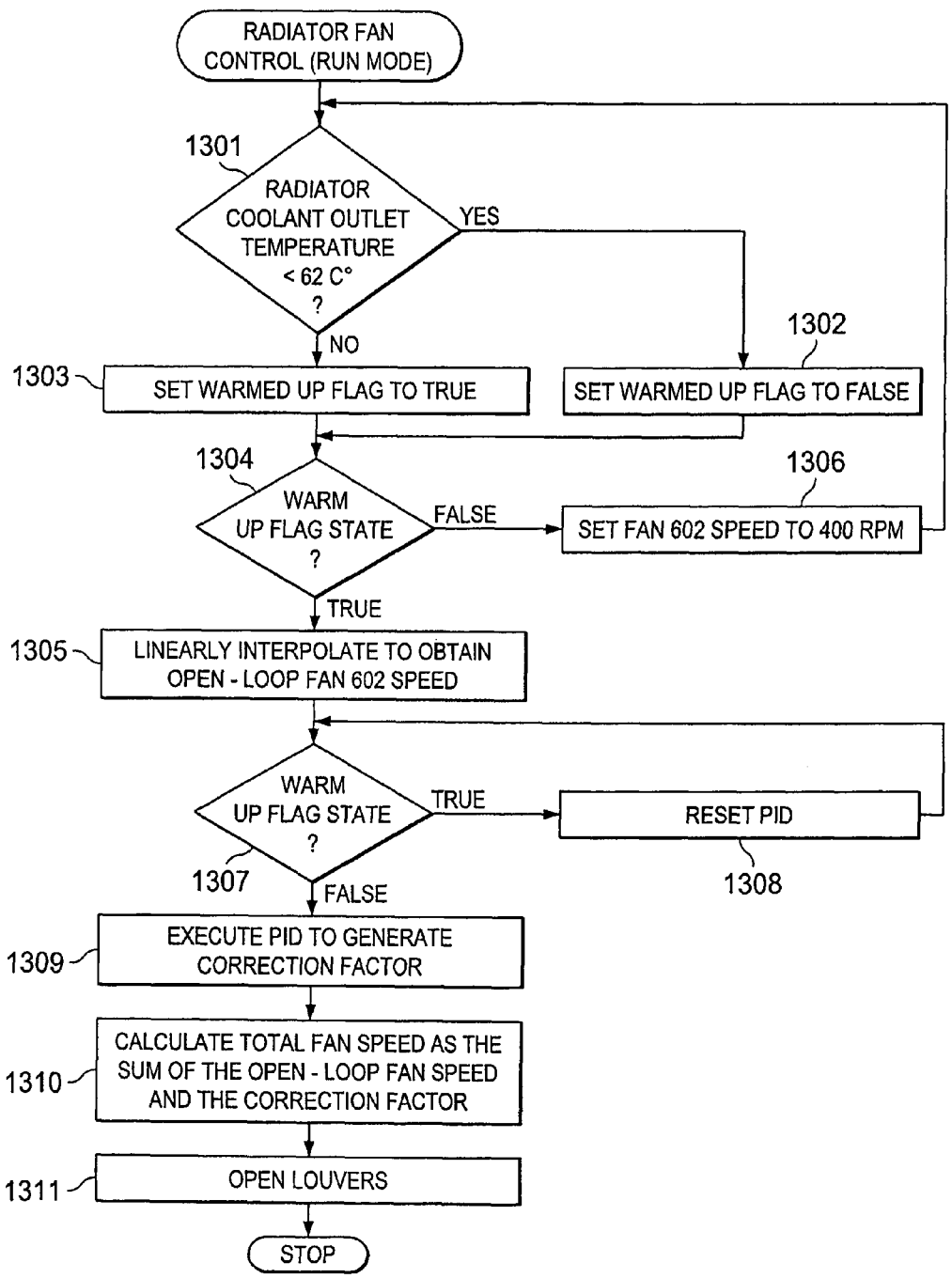
FIG. 13 is a flow chart of a preferred radiator fan control algorithm.

The radiator bypass control algorithm is shown in the flow chart of FIG. 12. The radiator bypass control outputs are:

1. Radiator bypass valve 604a position; and
2. Radiators outlet valve 604b position.

The radiator bypass control inputs are:

1. Primary coolant pump 603 outlet temperature;
2. Radiators 601 outlet temperature;
3. Power module 201a inlet temperature; and
4. Power module 201b inlet temperature.

The radiators bypass control ensures that the power module 201a-201b inlet temperatures are controlled to their setpoint of 65 C. Additionally, the algorithm ensures that radiator bypass valve 604a and radiator outlet valve 604b fail in the open position in order to prevent radiator damage if primary coolant pump 603 is running or is started.

In the shut down mode, a determination is made as to whether the system is "waiting to warm up." If the system is in warm up, then radiator bypass valve 604a and radiator outlet valve 604b are set to Position A, in which radiator bypass valve 604a is by default 95% open and radiator outlet valve 604b is by default 15% open. Otherwise, radiator bypass valve 604a and radiator outlet valve 604b are set to Position B, in which radiator bypass valve 604a is by default 20% open and radiator outlet valve 604a is by default 95% open) (i.e. the fail safe position, provides cooling in case a valve fails).

In the start up mode, radiator bypass valve 604a and radiator outlet valve 604b are set to their start up positions, in which radiator bypass valve 604a is set by default to 95% open and radiator outlet valve 604b is set by default to 5% open. These start up settings ensure that no heat is lost to the radiators 601 during start up.

In the run mode, the power modules 201 inlet temperature setpoints are set to 65 C (Block 1201). Then, if the average of the inlet temperatures to power modules 201a and 201b is below 62 C (Block 1202), then the Warmed Up flag is set to FALSE (Block 1204), otherwise the Warmed UP flag set to TRUE (Block 1203). (Once the Warmed Up flag is set TRUE, it is not set back to FALSE).

The open-loop portion of the valve control algorithm then proceeds as follows. If Warmed Up flag is false (Block 1205) then radiator outlet valve 604b is set to fully shut (Block 1206). Otherwise, if the Warmed Up flag is TRUE at Block 1205, radiator outlet valve 604b is set to the run position at Block 1207, which defaults to 100% open. In the illustrated embodiment, the movement of radiator outlet valve 604b is limited 100%/min.

The bypass valve 604a portion of the algorithm includes both open-loop and closed-loop portions. (The open loop portion provides fast and relatively accurate control and the closed loop portion corrects any residual error.)

The open loop portion uses temperature data from the radiators 601 inlet and the radiators 601 outlets to calculate a valve position which would be required to meet the power inlet temperature set point (i.e. 65 C in default). If at Block 1208 the radiator 601 inlet temperature is less than the power module 201 inlet temperature setpoint (no cooling is needed), then radiator bypass valve 604a is fully opened (Block 1209). Once the power modules have warmed up and the radiators inlet temperature is greater than the power module inlet temperature set (cooling is required), the radiator bypass valve 604a starts to close (Block 1210). The open loop sub-procedure (Block 1211) is preferably:

IF Primary Coolant Pump 603 outlet temperature(Primary Coolant Pump Temp)>=stack inlet temperature setpoint(Stack Inlet Temp. Setpoint)
   THEN $$\text{Open Loop Bypass Valve Setpoint} = \text{Open Loop Bypass Valve Max.}$$
$$-\left(\frac{\text{Primary Coolant Pump Temp} - \text{Stack Inlet Temp Setpoint}}{\text{Primary Coolant Pump Temp} - \text{Radiator Outlet Temp}}\right)100$$

ELSE

Open Loop Bypass Valve=Open Loop Bypass Valve Max.

Open Loop Bypass Valve Max. defaults to 95%.

The closed loop portion (Block 1212) uses power module 201 inlet temperature as closed loop to a regular PID routine in order to compensate for any steady state error. In particular, the closed loop portion is given by a PID, with a previous value that is the previous CV, not the actual valve output. The PID error value is calculated as:

Error=Stack Inlet Temp. Setpoint−Average of Power Module 201*a* and 201*b* Inlet Temperatures The PID gains for the illustrated embodiment are as follows:

| | |
|---|---|
| Kp = 0.75 | [%/C] |
| Ki = 0.02 | [1/sec] |
| Kd = 0.0 | [sec] |

The valve command is (clamped between 0 and 100%):

Outlet Bypass Valve Command=Open Loop Bypass Valve+Error

A dead band is applied to the valve command to prevent unnecessary valve chattering and wear. So that radiator bypass valve 604*a* can move to its minimum and maximum commands, the dead band is not applied when the valve is near its minimum and maximum commands.

As previously discussed, radiator fans 602 are used to control the radiators 601 outlet temperature. Generally, open loop control is used to set the approximate fan speed needed for the current heat load and closed loop control is used to compensate for any steady state errors. A preferred fan speed control algorithm is described in the flow chart of FIG. 13 for the run mode.

The outputs generated by the speed control algorithm are:
1. Radiator fan speed for both fans 602;
2. Radiator fan run command; and
3. Rear hood louvers open command.

The inputs operated on by the fan speed control algorithm are:
1. Radiator 601 coolant output temperature in C;
2. Stack Heat Load;
3. Rear hood louvers position limit switch; and
4. Rear hood hydrogen detector.

The fan speed control algorithm controls radiator 601 outlet temperature to 62 C, maintains a fan minimum speed of 400 RPM, an maintains a fan maximum speed of 1800 RPM. Additionally, this algorithm opens the rear hood louvers if the fans are running or if an elevated hydrogen level is detected in the read hood.

In the shutdown mode, the fan speed is set to 0% and the Warmed Up flag is set to FALSE. If the rear hood hydrogen detector AT is greater than 25%, the rear hood louvers open command is activated to open the louvers.

In the start up mode, the open loop fan speed is set to 400 RPM, the Warmed Up flag is set to FALSE, and the open louvers command is activated to open the louvers.

In the run mode, if the radiator coolant output temperature is less than 62 C (Block 1301), then the Warmed Up flag is set to FALSE (Block 1302), otherwise the Warmed Up flag is set to TRUE (Block 1303). (Once the Warmed Up flag is set to TRUE, it is not set back to FALSE. This flag is the same flag described in FIG. 12 for the radiator bypass valve control algorithm.)

During open loop control, if at Block 1304 the Warmed Up flag is FALSE, then the fan open loop speed is set to 400 RPM at Block 1305. Otherwise, at Block 1306, the open loop fan speed is determined based upon the power module heat load by linearly interpolating using the following table:

| Heat Load (kW) | Open Loop Fan Speed (RPM) |
|---|---|
| 40 | 200 |
| 75 | 400 |
| 150 | 800 |
| 300 | 1700 |
| 340 | 1700 |

During close loop control, if the Warmed Up command is false at Block 1307, the PID algorithm is reset at Block 1308 to prevent it from winding up the fan speed as the system comes up to temperature and closed loop fan speed is set to zero. Otherwise a correction for deviation from the radiator outlet temperature set point (defaults to 62 C), is determined by applying a PID at Block 1309. This PID is a slowly responding controller that is mainly for steady state error elimination, not for active transient correction. The initial controller gains are:

P=2
I=0.01%
D=0

The final fan speed command is then (Block 1310):

Fan Speed=Open Loop Fan Speed+Closed Loop Fan Speed.

The fan speed is limited to a maximum of 1800 RPM. A dead band (1.5%) is applied to the fan speed command to minimize unnecessary RPM changes. So that fans 602 can run at their minimum and maximum speed, the dead band is not applied when the fans are near their minimum and maximum speed (within 5%).

The open louvers command is activated to open the louvers (Block 1311).

In the shutting down mode, fans 602 run at 400 RPM and the louvers are open.

Figure 14:
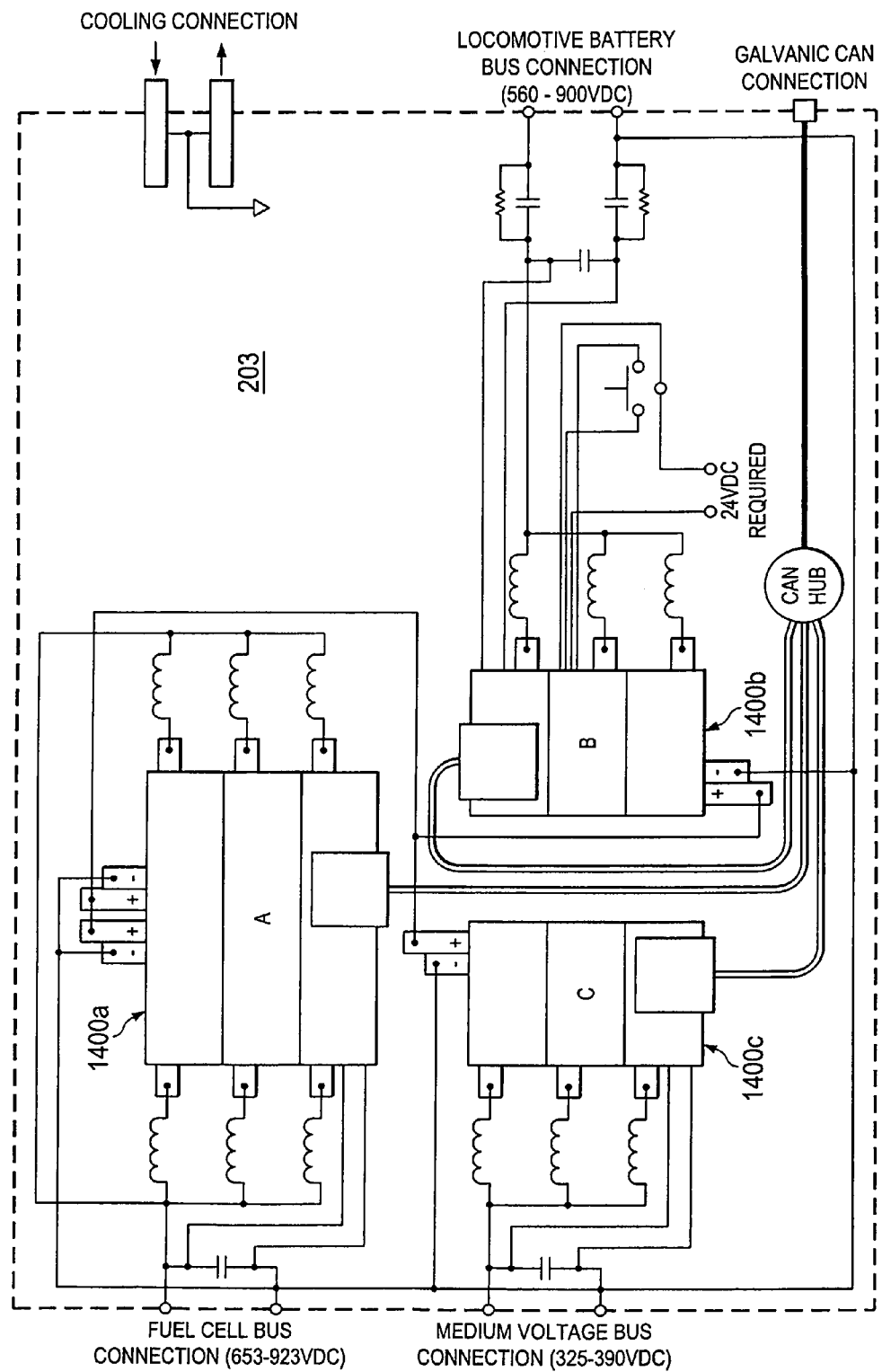
FIG. 14 is a block diagram of the DC to DC converter of FIG. 2.
Figures 15, 16:
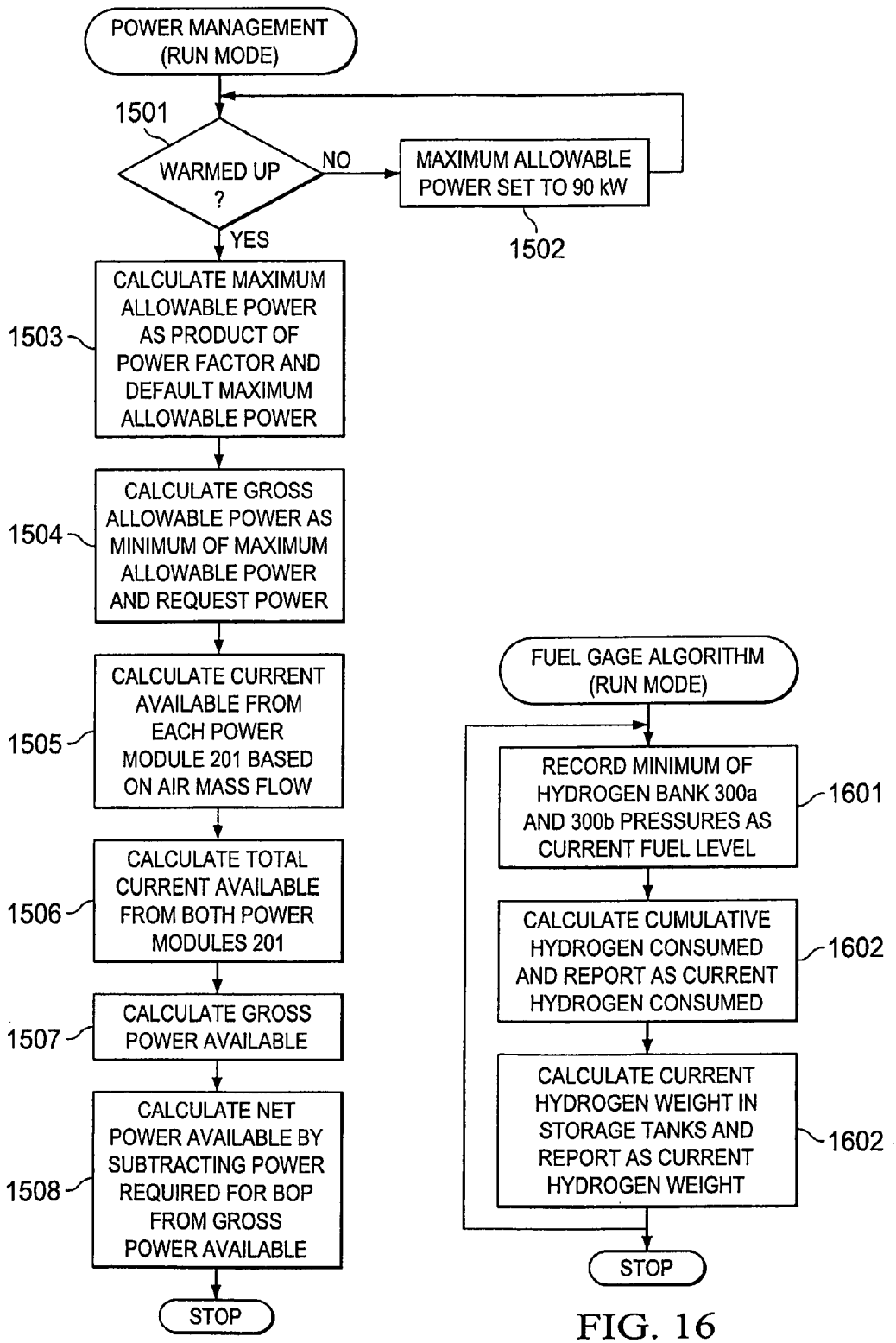
FIG. 15 is a flow chart of a preferred power management algorithm.
FIG. 16 is a block diagram of a preferred fuel gage algorithm.

A more detailed diagram of DC to DC converter 203 is provided as FIG. 14. The overall power management system is shown in FIG. 15.

During startup, power is drawn from the batteries and delivered to balance of plant 404. Once power modules 201*a* and 201*b* are up and running, power is drawn from power modules 201*a* and 201*b* and delivered to both the batteries 204 and balance of plant 404.

As shown in FIG. 14A, DC to DC converter 203 includes three (3) converter subsystems 1400*a* (Converter A), 1400*b* (Converter B), and 1400*c* (Converter C). In the preferred embodiment, each converter subsystem 1400 consists of set of American Superconductor PM1000 power conversion modules.

CAN communication, though the AmsCAN, v1.1, protocol is used to communicate with each converter subsystem 1400. Each converter subsystem is assigned a unique address.

Power modules 201*a* and 201*b* are used as a battery charger but exhibit a characteristic voltage droop as the current drawn from them increases. On the other hand, the batteries require a specific voltage/current profile during charging. As a result DC-DC Converter B, which couples to the locomotive battery bus, is commanded to follow this profile by the power module controller, regardless of the actual voltage being produced by power modules 201.

The inputs and the outputs to the DC to DC converter control algorithm are as follows.

of plant equipment during power plant startup and ensures that the voltage on the battery bus does not exceed the specified maximum. Additionally, the DC to DC control algorithm interprets and responds to DC-DC Converter faults and ensures that power is available at the output of Converter B in order to run the converter modules.

The DC to DC converter control algorithm is set out in the following table:

|  | Converter | | | |
| --- | --- | --- | --- | --- |
| System Mode | A (Fuel cell Input) | B (Battery In/Out) | C (Medium Bus Voltage Out) | Power Flow |
| Shutdown | Stop Mode | Stop Mode | Stop Mode | None |
| Startup | Stop Mode | Run Mode, Boost, Regulate Vbus_16 to 1000 VDC (Output Voltage Setpoint = 1000, Mode = 0) | Run Mode, Buck, Regulate Vbuck_16 to 350 VDC (Buck output Voltage = 350, Mode = 1) | From Locomotive Battery Bus to Medium Voltage Bus |
| Run | Run Mode, Boost, Regulate Vbus_16 to 1050 VDC (Output Voltage Setpoint = 1050, Mode = 0) | Run Mode, Buck, Regulate IoutFbk to Current needed to produce power setpoint at voltage of Battery Out (Buck Output Voltage = set to maximum voltage allowed on batt bus, take out = current setpoint, Mode = 1) | Run Mode, Buck, Regulate Vbuck_16 to 350 VDC (Buck Output Voltage = 350, Mode = 1) | From Fuel cell Bus to Battery Bus, From Fuel cell Bus to Medium Voltage Bus |
| Shutting Down | Run Mode, Boost, Regulate Vbus_16 to 1050 VDC (Output Voltage Setpoint = 1050, Mode = 0) | Run Mode, Buck, Regulate Vbus_16 to 1000 VDC (Output Voltage Setpoint = 1000, Mode = 0) | Run Mode, Boost, Regulate Vbuck_16 to 350 VDC (Buck Output Voltage = 350, Mode = 1) | Initially, power flow is from the Fuel cell Bus to the Medium Voltage Bus but then flows from the Battery Bus to the Medium Voltage Bus |

For Converter A the commands and control messages include:

1. Converter A Command Request (Run=0, Stop=1);
2. Converter A Parameter Write: Mode, output voltage set point.

For Converter B the commands and control messages include:

1. Converter B Command Request (Run=0, Stop=1);
2. Converter B Parameter Write: Mode, output voltage set point; and buck reference set point, and buck output voltage set point.

For Converter C the commands and control messages include:

1. Converter B Command Request (Run=0, Stop=1).
2. Converter C Parameter Write Mode, buck output voltage setpoint.

The unsolicited inputs include State Change, Fault Report, and Warning Report.

The hard inputs include locomotive battery bus voltage, locomotive battery bus current draw, BOP bus voltage, and BOP bus current draw.

The soft inputs include Net Power Available, which is the net power available from power modules 201 based on the current air mass flow rate, calculated in the Power Management algorithm discussed below.

The DC to DC converter control algorithm implements a number of functions. Among other things, this algorithm transfers the specified electrical power from the power modules 201 to the batteries. It also provides power for the balance As described in the table, upon entering Shutdown Mode, Converters A, B, and C are all commanded to stop. After which, while in the shutdown mode, DC to DC converter 203 is monitored for Unsolicited Reports.

Upon entering the start up mode, the output voltage set point for Converter B (DC to DC Output Voltage Setpoint) is set to 1000 VDC, the Converter B write mode is set to 0, and Converter B is commanded to run.

The Buck output voltage set point for Converter C is set to 350 VDC and the write mode for Converter C is set to 1.

During the startup mode, DC to DC converter 203 is monitored for Unsolicited Reports.

Upon entering the run mode, the Converter A output voltage set point (DC to DC Output Voltage Setpoint) is set to 1050 VDC, the write mode is set to 0, and Converter A is commanded to run. The write mode for Converter B is set to 1.

While in Run Mode, a PID control algorithm is run to account for errors in the current regulation in Converter B. In the preferred embodiment, the PID algorithm:

1. Calculates the current setpoint as:

Net Current Available=Net Power Available/Battery Bus Voltage;

2. Uses the Process Variable: Battery Bus Current Draw;
3. Generates output=Current Correction; and
4. Uses the PID Parameters:
    P: 0.1/A
    I: 1/sec
    D: disabled The output of the PID correction is added to the current setpoint to obtain the final current set point Final Current Setpoint=Net Current Available+Current Correction The final current set point (Final Current Setpoint) is written to BUCKPosIRefLim for Converter B.

The value for the maximum allowable voltage allowed on the battery bus becomes the back output setpoint for Converter B.

During the run mode, DC to DC converter 203 is monitored for Unsolicited Messages.

Upon entering Shutting Down Mode, a O is written as the Mode for Converter B. In the Shutting Down Mode, DC to DC converter 203 is monitored for Unsolicited Reports.

The power management algorithm dynamically adjusts for variations in the balance of plant 404 power consumption and limits the DC-DC converter set points based upon available air mass flow. The power management algorithm illustrated in the flow chart of FIG. 15.

The power management algorithm generates the following outputs:

1. Gross power setpoint used above in the main air compressor algorithm; and
2. Net power setpoint used above in the DC to DC converter algorithm.

The power management algorithm inputs include:

1. Power request either from locomotive or from HMI;
2. Power module 201*a* air mass flow;
3. Power module 201*b* air mass flow;
4. Ambient air temperature;
5. BOP 404 bus voltage;
6. BOP 404 current draw; and
7. Power factor. (The power factor reduces maximum allowed power, not the desired power, during times when an operating parameter is not within acceptable bounds.)

The power management algorithm limits a gross power request based upon any power factors in place or a warm up condition. This algorithm also raises or lowers the net power module 201 power setpoint in order to meet the locomotive power demand and balance of plant 404 power consumption. The power management algorithm also limits the power drawn by Converter B of DC to DC Converter 203 based upon available air mass flow.

In both the shutdown and startup modes, Gross Available Power is set to 10 kW and Net Power Available to 0 kW.

The run mode is described in detail in FIG. 15, but generally consists of the following steps. First, the gross power required by the locomotive is calculated. Second, a determination is made as to how much power the current air mass flow will support (i.e. the power available). Third, the power available is subtracted from the gross power required to calculate the net power available. This power is used as the setpoint to DC-DC Converter B.

In the flow chart of FIG. 15, the gross power allowed is calculated based on whether the system is Warmed UP (Block 1501), as determined by calculations in the radiator bypass and outlet valve control algorithms discussed above.

If not warmed up at Block 1501 THEN

Maximum Allowable Power=90 kW(Block 1502)

ELSE

Maximum Allowable Power=Power Factor*Default Maximum Allowable Power(Block 1503)

Gross Allowable Power=MIN(Maximum Allowable Power,Requested Power) (Block 1504)

Where the maximum Maximum Allowable Power defaults to 230 kW

The gross power available based upon the current air mass flow is the calculated, by first calculating the available current for each power module 201 (Block 1505):

Current Available Power Module 201*a*=Air Mass Flow $A$/(Stoichiometric Ratio $A*K$)

Current Available Power Module 201*b*=Air Mass Flow $B$/(Stoichiometric Ratio $B*K$)

Where K is a constant related to the number of cells in the power module stack and an air constant characterizing the particular fuel cell stacks used, for example, Ballard MK902 fuel cell stacks.

The total available current is calculated (Block 1506) as:

Total Current Available=Current Available Power Module 201*a*+Power Available Power Module 201*b*

The gross available power module power (Gross Available Power) is calculated at Block 1507 based upon the stack polarization curve for the type of fuel cells used:

Gross Power Available=$A*$(Total Current Available)$^2$+$B*$(Total Current Available)+$C$ [kW]

Where A, B, and C are constants based on the polarization curve for the type of fuel cell stack.

The net power available based upon the current mass air flow, is calculated (Block 1508) by subtracting off the power needed for balance of plant 404. This will be the setpoint to DC-DC converter 203 that delivers power to the battery bus (DC-DC Converter B).

Net Power Available=Gross Power Available

In the illustrated embodiment of hydrogen hybrid locomotive 100, three methods are used to determine the amount of hydrogen fuel available for power modules 201*a* and 201*b*: (1) monitoring the pressure in the hydrogen storage tanks 204 while running; (2) calculating the mass of the hydrogen consumed by power modules 201; and (3) calculating the mass of the hydrogen in the storage tanks. The amount of hydrogen lost to purging is calculated by subtracting the hydrogen consumed by power modules 201 from the change in weight of the hydrogen in the storage tanks.

The outputs generated by the fuel gage algorithm are:

1. Fuel Level—current amount of hydrogen fuel available in barG;
2. H2 Consumption—hydrogen consumed by power modules 201 in kg; and
3. H2 Weight—current weight of the hydrogen in the storage tanks.

The inputs to the fuel gage control algorithm are:

1. Rear bank of hydrogen tanks 300*a* pressure transmitter;
2. Front bank of hydrogen tanks 300*b* pressure transmitter;
3. Power module 201*a* current transmitter;
4. Power module 201*b* current transmitter;
5. Rear bank of hydrogen tanks 300*a* temperature transmitter; and
4. Front bank of hydrogen tanks 300*b* temperature transmitter.

While the power modules 201*a* and 201*b* are running, the fuel gage indicates to the operator, presented on display 208*b*, the current fuel available, the hydrogen consumed, and the current weight of the hydrogen in the storage tanks. The fuel gage also records the hydrogen pressure upon shutdown, since when power modules 201 are not running, the front and rear bank hydrogen pressure transmitters are isolated from the tanks they measuring. The fuel gage algorithm additionally records the hydrogen weight in the storage tanks upon shutdown, since when power modules 201 are not running, the front and rear hydrogen bank temperature sensors, as well as the front and rear hydrogen bank pressure transmitters, are isolated from the tanks they measuring.

In both the shutdown and startup modes, the fuel gage algorithm reads the previously recorded hydrogen fuel level from disc and reports it as the current fuel level. The previously recorded fuel weight and the previously recorded starting fuel weight are also read from disc and respectively reported as the current weight and the starting weight.

The fuel gage run mode is illustrated in the block diagram of FIG. 16. The minimum of the hydrogen bank pressure readings (i.e. front and back pressure transmitter readings) is recorded to a disc every 1 minute and the minimum is reported as the current fuel level on display 208b every 1 second (Block 1601).

The cumulative hydrogen consumed by the power modules 201 is calculated and saved to disc every 1 min. This calculation is reported as the current hydrogen consumed every 1 second (Block 1602). The hydrogen consumed by each power module is:

$$N = \frac{I_{stack} \times N_{cell}}{F \times N_{e^-/molecule}}$$

N=reactant flow rate, gmol/s
F=Faraday's constant, 96,485.3 coulomb/gmol
$N_{e^-/molecule}$=number of electrons transferred per molecule . . . =2 for $H_2$
This calculation is made for both power modules 201, the results are added together, and a running total kept.

The current hydrogen weight in the storage tanks calculated, saved to disc every 1 min, and reported as the current hydrogen weight every 1 second (Block 1603). The current hydrogen weight is:

$$m = \frac{P * V * mw}{R * T}$$

Figure 17:
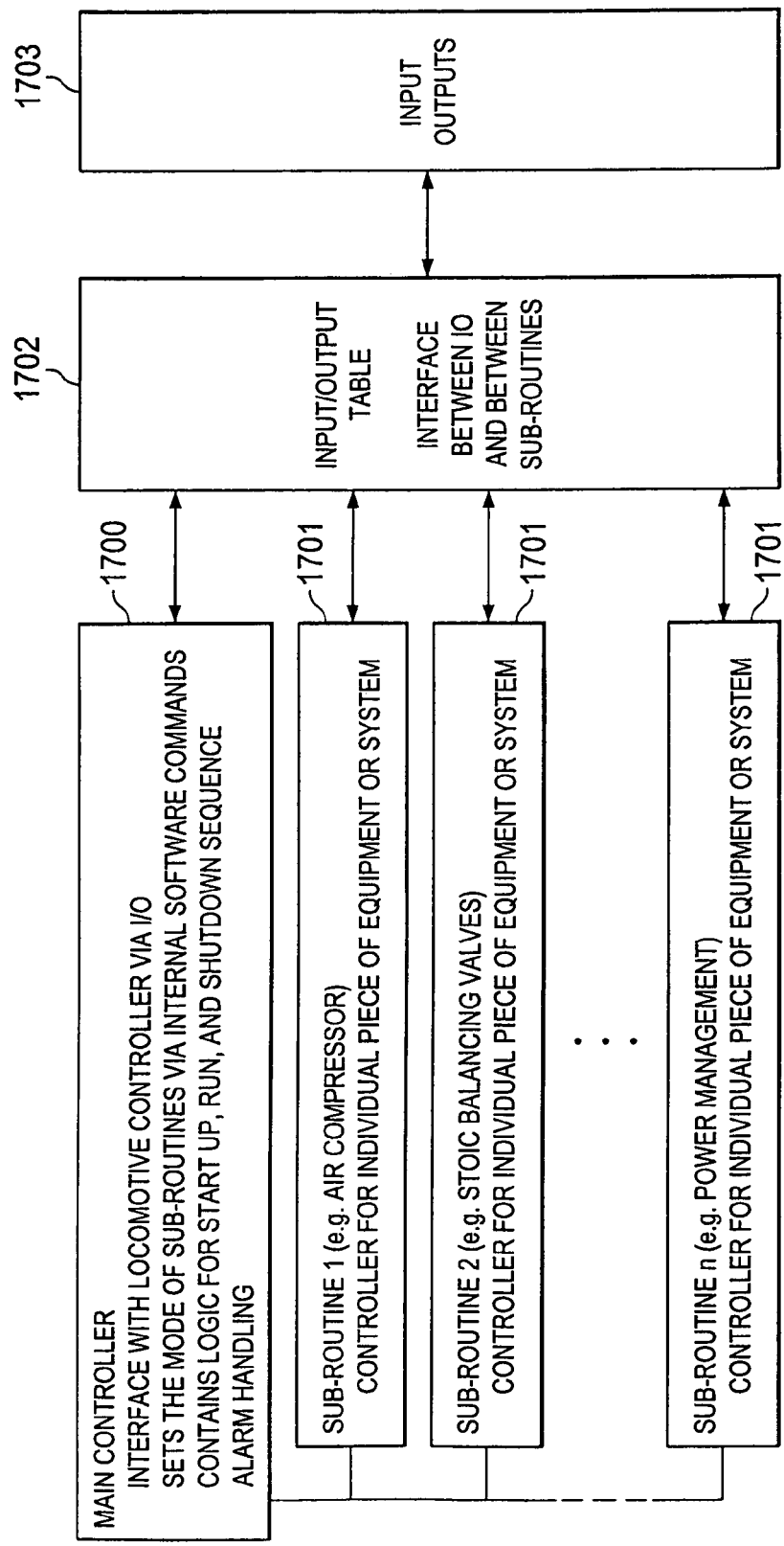
FIG. 17 is a block diagram of the programmable automation controller which, among other things, executes the various control algorithms.

Where:
m=mass in grams
P=pressure in ATM
V=volume (2870 L)
mw=molecular weight of hydrogen (2.02 g/mol)
R=ideal gas constant (0.08206 (L*ATM)/(K*mol))
T=temperature in K FIG. 17 is a block diagram illustrating the PAC 1700 architecture, which executes the algorithms discussed above. PAC 1700 is based on a conventional computer (hardware) processing system and interfaces with the locomotive controller, sets to modes of the various subroutines, and contains the logic hardware necessary to implement system start up, run, and shutdown sequences.

FIG. 17 executes various algorithms, including the air compressor, stoic balancing valves, radiator bypass, radiator fans, dc to dc converter, power management, and fuel gage control algorithms discussed above as corresponding subroutines 1701.

PAC 1700 also maintains an input/output table, which provides an interface between subroutines 1702 and with inputs and outputs 1703. Inputs and outputs 1703 provide the physical interface with the systems described above.

The principles of the present invention discuss above allow for the design and construction of practical railroad locomotives driven by a fuel cell—battery hybrid propulsion system. Such railroad locomotives are robust, and will withstand the harsh operating environments experienced during everyday use in a typical rail yard. At the same time, the use of hydrogen addresses many, if not all, of the problems related to the use of fossil fuels found in conventional diesel electric locomotives.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A method of operating a locomotive including a set of electrical traction motors, a fuel cell power module for generating electrical current for driving the traction motors by reacting hydrogen and an air mass, an air system for providing the air mass, a cooling system for cooling the fuel cell power module, and an electronic processing system, the method comprising performing with the processing system:
 requesting an amount of power from the power module;
 determining a required current for producing the requested amount of power;
 determining a stoic set point for the power module from the required current;
 determining an air mass flow set point for producing the requested amount of power from the required current, the stoic set point, and numerical factors characterizing the power module; and
 setting a compressor set point including a speed set point and torque set point of a compressor motor of the air system to produce the air mass flow for the requested amount of power.

2. The method of claim 1, further comprising performing with the processing system:
 measuring a radiator coolant outlet temperature at a radiator outlet of a radiator of a cooling system cooling loop wherein a radiator inlet of the radiator receives coolant from a fuel cell power module coolant outlet and the radiator outlet selectively provides coolant to a fuel cell power module coolant inlet;
 if the radiator coolant outlet temperature is below a selected threshold, setting a radiator fan to a warm-up fan speed;
 if the radiator coolant outlet temperature is above the selected threshold, interpolating linear between minimum fan speed and a maximum fan speed based on heat loading on the fuel cell power module to determine an open loop fan speed; and
 measuring the radiator coolant outlet temperature and in response performing closed loop correction on the open loop fan speed with the processing system to set a run mode fan speed.

3. The method of claim 2, further comprising performing with the processing system:
- measuring power module coolant inlet temperature at the power module coolant inlet;
- if the power module coolant inlet temperature is below a selected threshold, closing a radiator outlet valve and opening a bypass valve to bypass the radiator such that coolant from the power module coolant outlet is provided to the power module coolant input;
- if the power module coolant inlet temperature is above the selected threshold:
  - opening the radiator outlet valve;
- measuring a radiator inlet temperature at the radiator coolant inlet;
- if the radiator inlet temperature is below a selected power module coolant input temperature set point, opening the bypass valve; and
- if the radiator inlet temperature is above the selected power module coolant input temperature set point, closing the bypass valve by an amount proportional to a ratio of a difference between the radiator inlet temperature and a power module input set point and a difference between the radiator inlet temperature and radiator outlet temperature.

4. The method of claim 1, wherein the fuel cell power module comprises one of first and second fuel cell power modules, each fuel cell power module including a stoic control valve for balancing air flow between the first and second power modules, the method further comprising performing with the systems processor:
- determining a required current;
- determining a corresponding stoichiometric ratio for each of the first and second power modules from the required current;
- allocating a portion of the required current to each of the first and second power modules;
- determining an air mass flow set point for each of the first and second power modules from the corresponding allocated current, the corresponding stoic set point, and numerical factors characterizing of the power module;
- for each of the first and second power modules, determining a process variable from a ratio of a measured air mass flow to the power module to a sum of measured air mass flows to the first and second power modules; and
- for each of the first and second power modules, correcting the corresponding air mass flow set point with the corresponding process variable to generate a command for commanding the stoic valve of the selected power module to open or close.

5. The method of claim 1, wherein the locomotive includes a set of batteries for storing energy produced by the power module, electrical equipment, and a DC to DC converter for interfacing the power module with the batteries and the electrical equipment, the method further comprising performing with the processor:
- during a start up mode, transferring energy from the batteries to the electrical equipment across a medium voltage bus;
- during a run mode, transferring energy from the power module to the batteries across a battery bus and from the power module to the equipment across the medium voltage bus;
- during an initial phase of a shutdown mode, transferring energy from the power module to the equipment across the medium voltage bus and during a subsequent phase of the shutdown mode, transferring energy from the batteries to the equipment across the medium voltage bus.

6. The method of claim 5, further comprising managing with the processing system the power provided to the batteries from the power module during the run mode, comprising:
- determining a gross power available from the power module by determining a current available from the present air flow mass to the power module;
- determining a net power available to the batteries by subtracting power required for the equipment on the medium voltage bus from the power gross power available; and
- setting from the net power available a set point of the DC to DC converter for controlling an amount of energy transferred from the power module to the batteries across the battery bus.

7. The method of claim 6, further comprising determining with the processing system a maximum on the gross power available:
- calculating a maximum allowable power from the power module by multiplying a default maximum allowable power by a power factor; and
- calculating a gross allowable power as a minimum of the maximum allowable power and the requested power.

8. The method of claim 1, wherein the power cell is provided hydrogen fuel from a set of tanks, and the method further comprises determining the hydrogen in the tanks during a run mode by:
- recording a present minimum amount of hydrogen in the tanks;
- calculating an amount of hydrogen consumed based on the current produced by the power module and the hydrogen flow rate to the power module; and
- calculating a current weight of the remaining hydrogen in the tanks based on the hydrogen consumed.

9. A method of operating a hydrogen hybrid locomotive including a set of electrical traction motors, a fuel cell power plant having first and second fuel cell modules for generating electrical energy for driving the electrical traction motors, and a set of batteries for storing the electrical energy generated by the fuel cell power plant, comprising:
- receiving a request for an amount of power from the power plant;
- determining a required electrical current for producing the requested amount of power;
- allocating a portion of the required electrical current to each of the first and second fuel cell modules;
- determining an air mass flow to the first and second fuel cell modules required to generate the corresponding portions of the required electrical current;
- providing the required air mass flow to the first and second fuel cell modules with a compressor to produce the corresponding portions of the required electrical current;
- balancing the air mass flow through the first and second fuel cell modules with corresponding first and second stoic control valves;
- setting a radiator fan speed for a radiator within a coolant fluid path providing coolant flow between a coolant outlet of a selected fuel cell module and a coolant inlet of the selected fuel cell module to control a radiator coolant outlet temperature;
- selectively bypassing a portion of the coolant flow around the radiator through a bypass fluid path between the coolant outlet of the selected fuel cell module and the coolant inlet of the selected fuel cell module to control a coolant inlet temperature of the selected fuel cell module; and controlling the transfer of electrical energy from the fuel cell power plant to the batteries through a DC to DC converter system including a first DC to DC converter interfacing with a fuel cell bus coupled to the fuel cell power plant and a second DC to DC converter interfacing with a battery bus coupled to the batteries.

10. The method of claim 9, further comprising providing coolant fluid to the DC to DC converter and the compressor through a second coolant fluid path including a secondary radiator.

11. The method of claim 9, wherein:
determining the required current for producing the requested amount of power comprises determining the required current from a polarization curve characterizing a corresponding first and second power module; and
determining an air mass flow for each of the first and second power modules comprises:
    determining a stoic set point for the power module from the allocated current;
    determining a corresponding air mass flow set point for producing the allocated amount of current from the stoic set point of the power module and numerical factors characterizing the power module.

12. The method of claim 11, wherein balancing the air mass flow through the first and second fuel cell modules with corresponding first and second stoic control valves comprises:
for each of the first and second power modules:
    determining a process variable from a ratio of a measured air mass flow to the power module to a sum of measured air mass flows to the first and second power modules; and
    correcting the corresponding air mass flow set point with the process variable to generate a command for commanding the corresponding stoic valve of the power module to open or close.

13. The method of claim 9, wherein setting a radiator fan speed for a radiator within a coolant fluid path providing coolant flow between a coolant outlet of a selected fuel cell module and a coolant inlet of the selected fuel cell module to control a radiator coolant outlet temperature comprises:
measuring the radiator coolant outlet temperature;
if the radiator coolant outlet temperature is below a selected threshold, setting a radiator fan to a warm-up fan speed;
if the radiator coolant outlet temperature is above the selected threshold, calculating a open loop fan speed based on heat loading on at least one of the first and second power plants; and
monitoring the radiator coolant outlet temperature and in response performing closed loop correction on the open loop fan speed.

14. The method of claim 9, wherein selectively bypassing a portion of the coolant flow around the radiator through a bypass fluid path between the coolant outlet of the selected fuel cell module and the coolant inlet of the selected fuel cell module to control a coolant inlet temperature of the selected fuel cell module comprises:
measuring a coolant inlet temperature at the coolant inlet of the selected fuel cell module;
if the coolant inlet temperature is below a selected threshold, closing a radiator outlet valve and opening a bypass valve to bypass the radiator such that coolant from the selected fuel cell module coolant outlet is provided to coolant input of the selected fuel cell module;
if the coolant inlet temperature is above the selected threshold:
    opening the radiator outlet valve;
    measuring a radiator inlet temperature;
    if the radiator inlet temperature is below a selected coolant input temperature set point for the selected fuel cell module, opening the bypass valve; and
    if the radiator inlet temperature is above the selected coolant temperature set point for the selected fuel cell module, closing the bypass valve by an amount proportional to a ratio of a difference between the radiator inlet temperature and the selected coolant temperature set point and a difference between the radiator inlet temperature and a radiator outlet temperature.

15. The method of claim 9, wherein controlling the transfer of electrical energy from the fuel cell power plant to the batteries through a DC to DC converter system including a first DC to DC converter interfacing with a fuel cell bus coupled to the fuel cell power plant and a second DC to DC converter interfacing with a battery bus coupled to the batteries comprises:
during a start up mode, transferring energy from the battery bus through to a medium voltage bus through the second DC to DC converter and a third DC to DC converter interfacing with the medium voltage bus;
during a run mode, transferring energy from the fuel cell modules to the batteries to the battery bus through the first and second DC to DC converters and from the fuel cell modules to the medium voltage bus through the first and third DC to DC converters; and
during an initial phase of a shutdown mode, transferring energy from the fuel cell modules to the medium voltage bus through the first and third DC to DC converters and during a subsequent phase of the shutdown mode, transferring energy from the batteries to the medium voltage bus through the second and third DC to DC converters.

16. The method of claim 15, further comprising:
determining a gross power available from the fuel cell modules by determining a current available from the present air flow mass to the power module;
determining a net power available to the batteries by subtracting power required for equipment on the medium voltage bus from the power gross power available; and
setting from the net power available a set point of the DC to DC converters for controlling an amount of energy transferred from the fuel cell modules to the batteries.

17. The method of claim 16, further comprising determining a maximum on the gross power available:
calculating a maximum allowable power from the fuel cell modules by multiplying a default maximum allowable power by a power factor; and
calculating a gross allowable power as a minimum of the maximum allowable power and the requested power.

18. A hydrogen hybrid locomotive comprising:
a set of electrical traction motors;
a fuel cell power plant having first and second fuel cell modules for generating electrical energy for driving the electrical traction motors;
a set of batteries for storing the electrical energy generated by the fuel cell power plant; and
an electronic processing system including at least one electronic processor operable to:
    receive a request for an amount of power from the power plant;

determining a required electrical current for producing the requested amount of power;

allocate a portion of the required electrical current to each of the first and second fuel cell modules;

determine an air mass flow to the first and second fuel cell modules required to generate the corresponding portions of the required electrical current;

command a compressor to provide the required air mass flow to the first and second fuel cell modules to produce the corresponding portions of the required electrical current;

command first and second stoic control valves to balance the air mass flow through the first and second fuel cell modules;

set a radiator fan speed for a radiator within a coolant fluid path providing coolant flow between a coolant outlet of a selected fuel cell module and a coolant inlet of the selected fuel cell module to control a radiator coolant outlet temperature;

selectively bypass a portion of the coolant flow around the radiator through a bypass fluid path between the coolant outlet of the selected fuel cell module and the coolant inlet of the selected fuel cell module to control a coolant inlet temperature of the selected fuel cell module; and control the transfer of electrical energy from the fuel cell power plant to the batteries through DC to DC converter system including a first DC to DC converter interfacing with a fuel cell bus coupled to the fuel cell power plant and a second DC to DC converter interfacing with a battery bus coupled to the batteries.

19. The hydrogen hybrid locomotive of claim 18, wherein the processing system is further operable to:

calculate the required current for producing the requested amount of power; and calculate an air mass flow for each of the first and second fuel cell modules by:

calculating a stoic set point for each fuel cell module from the allocated current for the fuel cell module; and calculating a corresponding air mass flow set point for each fuel cell module for producing the allocated amount of current from the stoic set point of the fuel cell module and numerical factors characterizing the fuel cell module.

20. The hydrogen hybrid locomotive of claim 18, wherein the processing system is further operable to balance the air mass flow through the first and second fuel cell modules with the first and second stoic control valves by:

for each of the first and second fuel cell modules:

calculate an open-loop process variable from a ratio of a measured air mass flow to the fuel cell module to a sum of measured air mass flows to the first and second fuel cell modules; and perform closed-loop correction of the corresponding air mass flow set point with the process variable to generate a command for commanding the corresponding stoic valve of the power module to open or close.

21. The method of claim 18, wherein the processing system is operable to set the radiator fan speed by:

measuring the radiator coolant outlet temperature;

if the radiator coolant outlet temperature is below a selected threshold, set the radiator fan to a warm-up fan speed;

if the radiator coolant outlet temperature is above the selected threshold, calculate a open loop fan speed based on heat loading on at least one of the first and second fuel cell modules; and monitor the radiator coolant outlet temperature and in response performing closed loop correction on the open loop fan speed.

22. The method of claim 18, wherein the processing system is operable to selectively bypass a portion of the coolant flow around the radiator by:

measuring coolant inlet temperature at the coolant inlet of the selected fuel cell module;

if the coolant inlet temperature is below a selected threshold, commanding a radiator outlet valve to close and commanding a bypass valve to open to bypass the radiator such that coolant from the selected fuel cell module coolant outlet is provided to coolant input of the selected fuel cell module;

if the coolant inlet temperature is above the selected threshold:

commanding the radiator outlet valve to open;

measuring a radiator inlet temperature;

if the radiator inlet temperature is below a selected coolant input temperature set point for the selected fuel cell module, commanding the bypass valve to open; and if the radiator inlet temperature is above the selected coolant temperature set point for the selected fuel cell module:

calculating a ratio of a difference between the radiator inlet temperature and the selected coolant temperature set point and a difference between the radiator inlet temperature and a radiator outlet temperature; and in response to calculating the ratio, commanding the bypass valve to close by a proportional amount.

23. The hydrogen hybrid locomotive of claim 18, wherein the processing system is operable to control the transfer of electrical energy by:

during a start up mode, commanding the transfer of energy from the battery bus through to a medium voltage bus through the second DC to DC converter and a third DC to DC converter interfacing with the medium voltage bus;

during a run mode, commanding the transfer or energy from the fuel cell modules to the batteries through the battery bus and the first and second DC to DC converters and from the fuel cell modules to the medium voltage bus through the first and third DC to DC converters; and during an initial phase of a shutdown mode, commanding the transfer of energy from the fuel cell modules to the medium voltage bus through the first and third DC to DC converters and during a subsequent phase of the shutdown mode, commanding the transfer of energy from the batteries to the medium voltage bus through the second and third DC to DC converters.

* * * * *